US012674998B2

(12) United States Patent
Niu

(10) Patent No.: US 12,674,998 B2
(45) Date of Patent: Jul. 7, 2026

(54) OPTICAL IMAGING SYSTEM AND DEVICE FOR FLOATING DISPLAY, AND SURROUND-VIEW DISPLAY DEVICE

(71) Applicant: SHANGHAI YUPEI PHOTOELECTRIC TECHNOLOGY LIMITED, Shanghai (CN)

(72) Inventor: Lei Niu, Shanghai (CN)

(73) Assignee: SHANGHAI YUPEI PHOTOELECTRIC TECHNOLOGY LIMITED, Shanghai (CN)

( * ) Notice: Subject to any disclaimer, the term of this patent is extended or adjusted under 35 U.S.C. 154(b) by 602 days.

(21) Appl. No.: 17/872,867

(22) Filed: Jul. 25, 2022

(65) Prior Publication Data

US 2022/0365364 A1 Nov. 17, 2022

Related U.S. Application Data

(63) Continuation of application No. PCT/CN2020/138285, filed on Dec. 22, 2020.

(30) Foreign Application Priority Data

Jan. 23, 2020 (CN) .......................... 202010076436.4

(51) Int. Cl.
*G02B 30/56* (2020.01)
*G02B 3/06* (2006.01)
(Continued)

(52) U.S. Cl.
CPC ........... *G02B 30/56* (2020.01); *G02B 5/0284* (2013.01); *G02B 5/124* (2013.01); *G02B 17/08* (2013.01); *G02B 3/06* (2013.01); *G02B 5/005* (2013.01)

(58) Field of Classification Search
CPC ...... G02B 30/56; G02B 5/005; G02B 5/0215; G02B 5/0284; G02B 5/0294; G02B 5/124; G02B 17/08; G02B 3/06; G09G 3/003
(Continued)

(56) References Cited

U.S. PATENT DOCUMENTS

| 10,310,284 B1 * | 6/2019 | Waldron .............. H04N 13/398 |
| 2009/0015917 A1 | 1/2009 | Iwamoto et al. |

(Continued)

FOREIGN PATENT DOCUMENTS

| CN | 104062766 | 9/2014 |
| CN | 106249423 | 12/2016 |

(Continued)

OTHER PUBLICATIONS

International Search Report issued for International Patent Application No. PCT/CN2020/138285, Date of mailing: Mar. 29, 2021, 6 pages including English translation.

(Continued)

*Primary Examiner* — Thomas K Pham
*Assistant Examiner* — Justin W. Hustoft
(74) *Attorney, Agent, or Firm* — HSML P.C.

(57) ABSTRACT

The invention relates to an optical imaging system (100) and a device for floating display, and a surround-view display device (2000). The optical imaging system (100) sequentially defines, along the optical axis thereof, an object plane (10), a first image plane (101) and a second image plane (102), and the optical imaging system (100) comprises at least one imaging unit (110) arranged between the object plane (10) and the first image plane (101) on the optical axis, with the at least one imaging unit (110) having different light converging capabilities in a first direction and in a second direction, and the first direction and the second direction
(Continued)

Sectional View in the First Direction

Sectional View in the Second Direction being orthogonal to the optical axis, respectively; and a main diffusion screen (120) diverging light in the second direction, the optical imaging system (100) being configured such that a light beam from a point on the object plane (10) forms a line image in the first direction on the first image plane (101), and the light beam from a point on the object plane (10) forms a line image in the second direction on the second image plane (102), with the second image plane (102) being a floating image plane.

19 Claims, 24 Drawing Sheets

(51) Int. Cl.
| | | |
|---|---|---|
| *G02B 5/00* | (2006.01) | |
| *G02B 5/02* | (2006.01) | |
| *G02B 5/124* | (2006.01) | |
| *G02B 17/08* | (2006.01) | |

(58) Field of Classification Search
USPC .......................................................... 359/599
See application file for complete search history.

(56) References Cited

U.S. PATENT DOCUMENTS

| | | | |
|---|---|---|---|
| 2013/0009862 A1 | 1/2013 | Chan et al. | |
| 2013/0083291 A1* | 4/2013 | Smithwick .......... | G02B 5/0257 |
| | | | 353/7 |
| 2015/0177313 A1* | 6/2015 | Hoelter .............. | G01R 31/2656 |
| | | | 324/754.21 |
| 2016/0154248 A1* | 6/2016 | Lee ......................... | G02B 5/005 |
| | | | 359/894 |
| 2016/0236079 A1* | 8/2016 | Lin ......................... | A63F 13/25 |
| 2017/0227929 A1* | 8/2017 | Suginohara ........... | G02B 30/40 |
| 2018/0045972 A1 | 2/2018 | Dai et al. | |
| 2018/0203244 A1* | 7/2018 | Hatanaka ............... | G02B 5/136 |
| 2019/0011706 A1* | 1/2019 | Lee .......................... | G03H 1/10 |
| 2019/0129290 A1* | 5/2019 | Tian ...................... | G03B 21/20 |
| 2019/0227489 A1* | 7/2019 | Tokuchi .............. | G06V 40/113 |
| 2019/0310482 A1* | 10/2019 | Schultz ................... | G02B 5/04 |

FOREIGN PATENT DOCUMENTS

| | | |
|---|---|---|
| CN | 110264916 | 9/2019 |
| JP | H09318911 A | 12/1997 |
| JP | 2011203731 A | 10/2011 |
| JP | 2018010223 A | 1/2018 |
| JP | 2018105966 A | 7/2018 |
| JP | 2019101055 A | 6/2019 |

OTHER PUBLICATIONS

Notice of Reasons for Refusal issued for Japanese Patent Application No. 2022-545127, Dispatch Date: Aug. 8, 2023, 8 pages including partial English translation.

* cited by examiner

100

100

Sectional View in the First Direction

Sectional View in the Second Direction

Line Image of Object
Point "P" on Image
Plane 101

Line Image of Object
Point "P" on Image
Plane 102

Sectional View in the First Direction

Sectional View in the Second Direction

300

300

Sectional View in the First Direction

Sectional View in the Second Direction

Sectional View in the First Direction

Sectional View in the Second Direction a.Lens/Mirror b.One-Dimensional Retroreflector (with a
V-Shaped Groove Angle of 90 Degrees)

One-Dimensional Retroreflector

Reflected at the Original Angle in One Direction

Specularly Reflected in Another Direction

Directional Diffusor

View-Angle Control Film

Diffusor

Sectional View in the First Direction

Sectional View in the Second Direction

Entrance Pupil

Exit Pupil

L1

L2

Perspective View

Floating Image Plane (102)

1520 (101)

1500

Light Source    Display Screen (10)

1530

1512    1511

Side View

Floating Image Plane (102)

1520 (101)

1500

Light Source    Display Screen (10)

1530

1512    1511

Top View

1500

Light Source    Display Screen (10)

1530

1512    1511    1520 (101)

<u>2000</u>

OPTICAL IMAGING SYSTEM AND DEVICE FOR FLOATING DISPLAY, AND SURROUND-VIEW DISPLAY DEVICE

TECHNICAL FIELD

Embodiments described herein relate generally to the field of optical display technology, and more particularly to an optical imaging system for floating display, a floating display device, and a surround-view display device, which can be used for naked-eye 3D display.

BACKGROUND

Among the numerous display technologies, aerial floating display technology has attracted the attention of many researchers because it can present images in the air and bring to the viewer a strong visual impact and a sensory experience that appears both real and imaginary.

Conventional floating display technologies include using retroreflectors, lens groups, or integrated imaging to achieve floating display. However, for the approaches that use retroreflectors or lens group, the volume of the display system is large, and with the increased size of the floating image, the volume of the display system also needs to be increased; for the approaches that use integrated imaging, many microdisplay units are needed to project floating images in space, which makes it difficult to achieve high resolution and the cost of such screen is too high.

Therefore, there is a need in the art for a new technical solution for floating display.

SUMMARY

It is an object of the exemplary embodiment of the present invention to provide an optical imaging system for floating display that can realize a floating display with unidirectional parallax while having a slimmer design and lower cost.

In particular, exemplary embodiments of the present invention provide an optical imaging system for floating display, the optical imaging system sequentially defining an object plane, a first image plane and a second image plane along its optical axis, the optical imaging system comprising: at least one imaging unit located on an optical axis between the object plane and the first image plane, wherein the at least one imaging unit has different light-converging capabilities in a first direction and a second direction, the first direction and the second direction being orthogonal to the optical axis, respectively; and a main diffusor diverging light along the second direction, wherein the optical imaging system is configured to cause a light beam from a point on the object plane to form a line image in the first direction on the first image plane, and to cause a light beam from a point on the object plane to form a line image in the second direction on the second image plane, wherein the second image plane is a floating image plane.

According to another embodiment of the present invention, there is provided a floating display device comprising: an optical imaging system as described above; and an image display unit configured to emit light constituting an image toward the object plane of the optical imaging system.

According to yet another embodiment of the present invention, there is provided a surround-view display device comprising a plurality of floating display devices as described above, arranged in a spliced manner.

BRIEF DESCRIPTION OF THE FIGURES

The invention may be better understood by describing exemplary embodiments of the invention in conjunction with the accompanying drawings, in which.

DESCRIPTION OF THE INVENTION EMBODIMENTS

Specific embodiments of the present invention will be described below. It should be noted that, in the detailed description of these embodiments, all features of the actual embodiments may not be described in detail for the sake of brevity and conciseness of the description. It should be understood that, in the actual implementation of any one of the embodiments, just as in the process of any engineering project or design project, in order to achieve the developers' specific goals and in order to meet system-related or business-related restrictions, a variety of concrete decisions are often made, and this varies from one implementation to another. In addition, it should also be understood that, although the effort made in such developing process may be complex and time-consuming, some variations such as design, manufacture and production on the basis of the technical contents disclosed in the disclosure are just customary technical means in the art for one of ordinary skilled in the art associated with the technical contents disclosed in the present disclosure, and the present disclosure should not be construed as insufficient disclosure.

Unless otherwise defined, technical or scientific terms used in the claims and the description shall have the ordinary meaning understood by one of ordinary skills in the art to which this invention belongs. "First", "second," and similar terms used in the description and claims of the present invention do not imply any order, quantity, or importance, but are merely used to distinguish different components. "One", "a/an", or similar terms do not imply any quantitative limitation, but rather means "at least one". "Including" or "comprising" and the like means that an element or item appearing before "including" or "comprising" covers an element or item and its equivalents listed after "including" or "comprising", and does not exclude other elements or items. "Connected", "coupled" and the like are not limited to physical or mechanical connections, nor are they limited to direct or indirect connections.

Figure 1A:
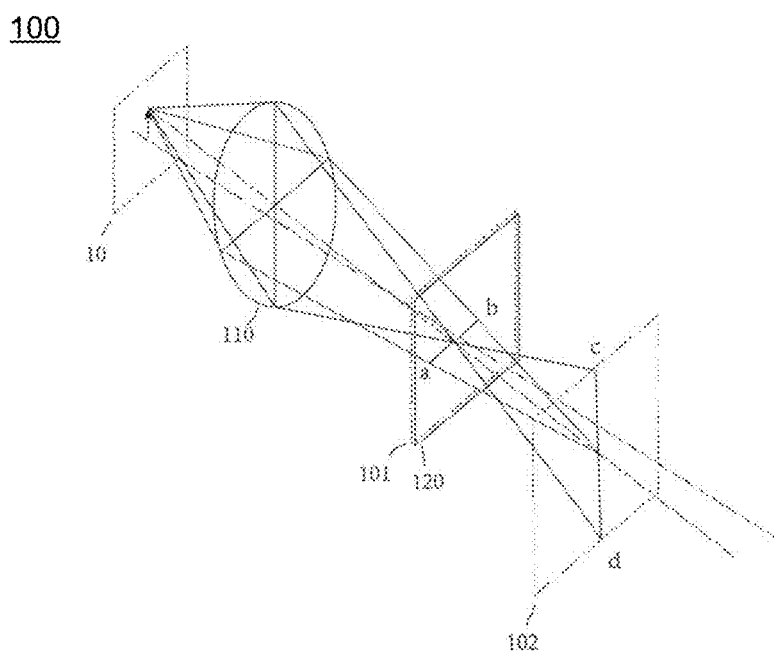
FIG. 1A shows a schematic diagram of the principle of an imaging process of an optical imaging system 100 for floating display according to an embodiment of the present invention.
Figure 1B:
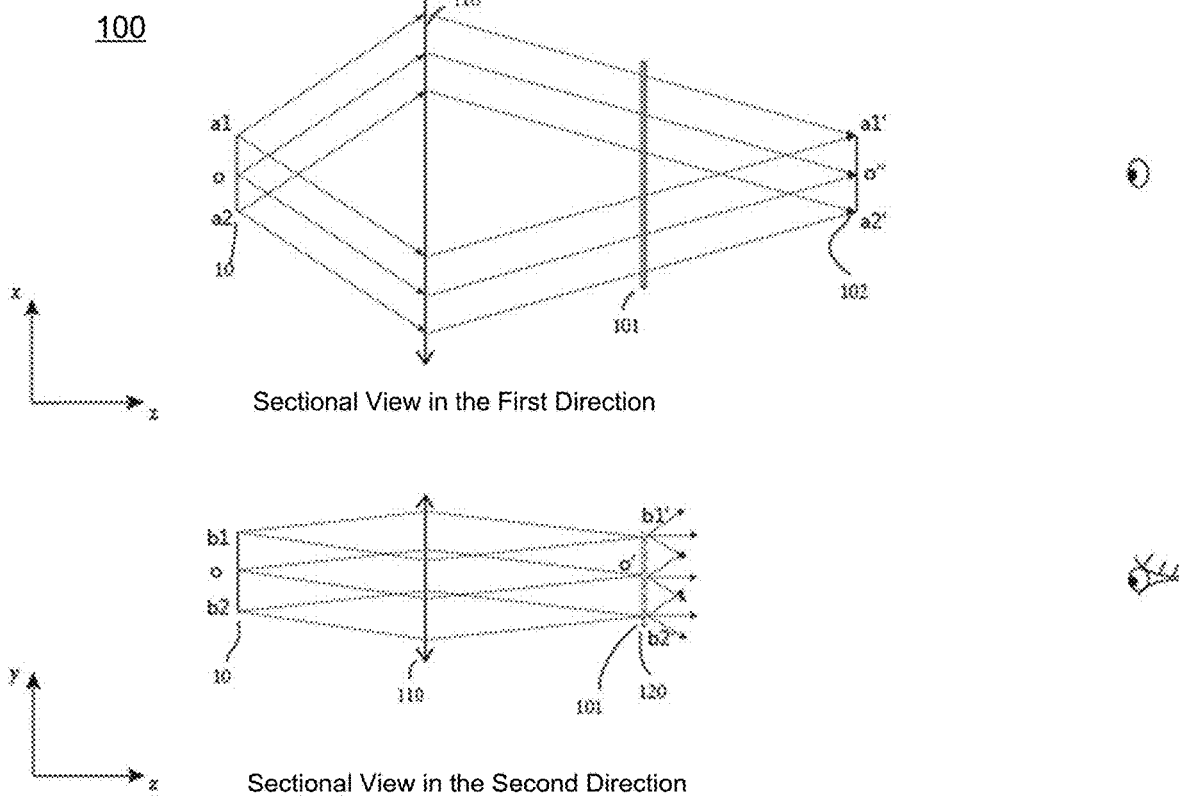
FIG. 1B shows a schematic diagram of the principle of light propagations in the horizontal direction and the vertical direction, respectively, of an optical imaging system 100 for floating display according to an embodiment of the present invention.

FIG. 1A shows a schematic diagram of the principle of an imaging process of an optical imaging system 100 for floating display according to an embodiment of the present invention. FIG. 1B shows a schematic diagram of the principle of light propagation in the horizontal direction and the vertical direction, respectively, of the optical imaging system 100 for floating display according to an embodiment of the present invention.

Referring to a perspective view of light transmission of FIG. 1A, an optical imaging system 100 for floating display according to an embodiment of the present invention may sequentially define an object plane 10, a first image plane 101 and a second image plane 102 along its optical axis. The optical imaging system may include at least one imaging unit 110 and a main diffusor 120. At least one imaging unit 110 is located between the object plane and the first image plane along the optical axis, and has different light-converging capabilities in the first direction and the second direction. The first direction and the second direction are orthogonal to the optical axis, respectively. The main diffusor 120 diverges light in the second direction. The optical imaging system 100 is configured such that a light beam from a point on the object plane 10 forms a line image in the first direction on the first image plane 101 and that the light beam from the point on the object plane 10 forms a line image in the second direction on the second image plane 102. The second image plane 102 is a floating image plane. Optionally, the main diffusor 120 may be placed within the depth of focus (which may be referred to as depth of field in general) of the first image plane 101.

The light beam propagation of the optical imaging system 100 is profiled in the first direction and the second direction respectively. The first direction and the second direction may be substantially orthogonal. For example, the first direction may be a horizontal direction and the second direction may be a vertical direction, and vice versa. Referring to FIG. 1B, in the first direction, light rays emitted at the object points a1, o, a2 on the object plane 10 have a large divergence angle and are imaged as a1', o", a2' on the second image plane 102 by the at least one imaging unit 110 (such as a lens, a retroreflector, a cylindrical mirror, etc.). In the second direction, light rays emitted at the object points b1, o, b2 are imaged on the first image plane 101 through the at least one imaging unit 110 to form the image points b1', o', b2'. The main diffusor 120 is placed within the depth of focus of the first image plane 101 (shown as being placed at the first image plane 101 as an example), and the light rays of the image points b1', o', b2' are scattered by the diffusor 120 in the second direction, thereby forming a larger view-angle range in the second direction. In this way, the image-side aperture angle of the points on the object plane 10 imaged by the main imaging unit 110 in the first direction is relatively large (i.e., 20 degrees or more, preferably more than 30 degrees) to satisfy the binocular parallax conditions, whereby a floating image having parallax in the first direction without parallax in the second direction can be formed at the second image plane 102.

Figure 2:
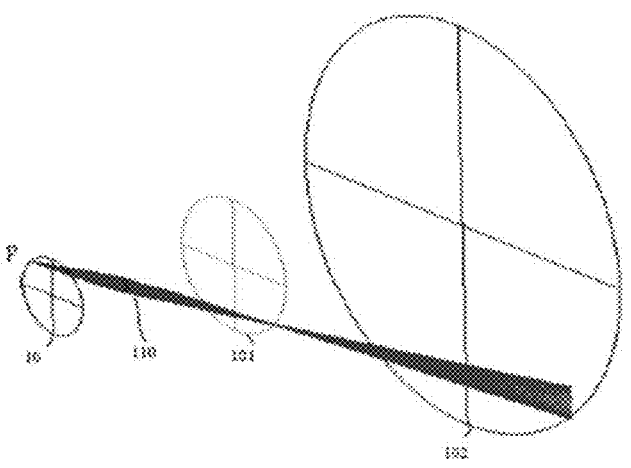
FIG. 2 shows a schematic diagram of imaging of light at a point on an object plane within an optical imaging system 100 according to an embodiment of the present invention.
Figure 2:
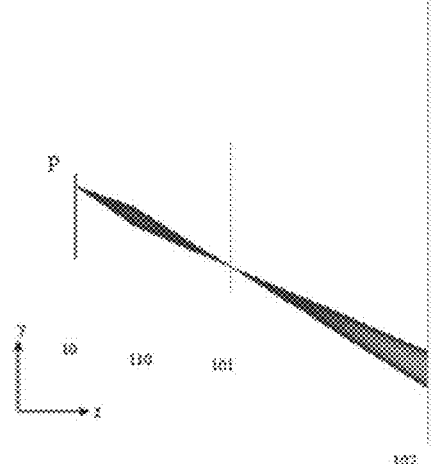
Figure 2:
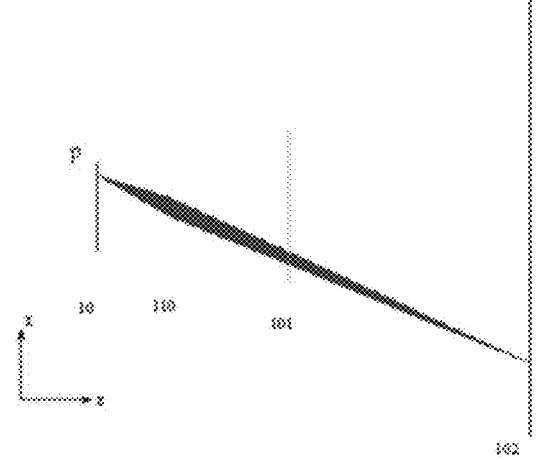
Figure 2:
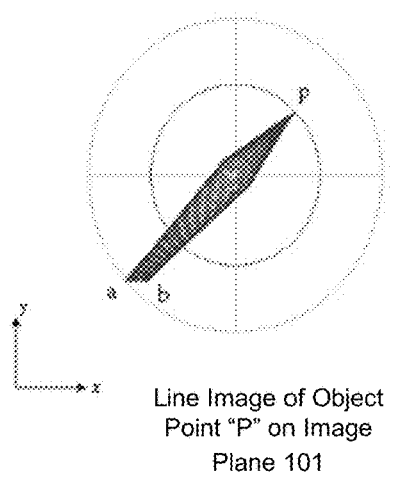
Figure 2:
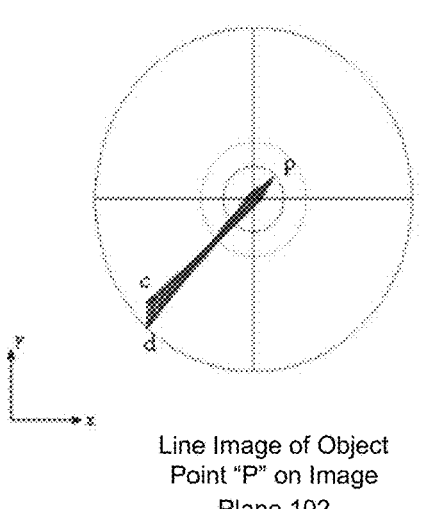

FIG. 2 shows a schematic diagram of imaging light at a point on the object plane within the optical imaging system 100 according to an embodiment of the present invention. As can be seen from FIG. 2, a point "p" on the object plane 10 forms a line image "ab" and a line image "cd" on the first image plane 101 and the second image plane 102 via the imaging unit 110, respectively.

The object plane 10 may be a display surface of a self-emissive display or a projection surface generated by a projection-based display, and the light emitted by the display (i.e., the image source) may be set according to the requirement of light divergence angle. In particular, the light emitted from the object point on the object plane needs to have a certain object-side aperture angle in the first direction (for example, 30 degrees to 180 degrees, which is determined by the image-side aperture angle according to Laplace invariant formula as needed). This may be achieved by the inherent characteristics of the light source (i.e., the image source) or by modulating the light from the light source (i.e., the image source). For example, since a self-emissive display such as an OLED can emit light with a large divergence angle, the effect of floating display can be achieved when the display surface thereof is provided at the object plane of the optical imaging system 100.

Optionally, in the case where the light emitted by the object point on the object plane 10 does not have a large divergence angle in the first direction, an additional diffusor may be provided at the object plane 10 for diverging the light in the first direction, so that the light emitted from the additional diffusor has a large divergence angle in the first direction.

As described above, the at least one imaging unit 110 is configured to have different light-converging capabilities in the first direction and the second direction. For a lens, it means that the lens has different focal lengths f in the first direction and the second direction and f can be infinity ($\infty$), such as a cylindrical mirror which has infinite f (i.e., f=$\infty$) in the second direction. One-dimensional retroreflector can also be used to achieve this effect. The imaging unit 110 may include a main imaging unit for imaging and one or more auxiliary imaging units or optical elements for propagating or modulating light rays. Note that, each of the at least one imaging unit 110 may be one optical element or a combination of a plurality of optical elements.

Optionally, in some embodiments, the at least one imaging unit 110 may include a main imaging unit and an auxiliary imaging unit. The main imaging unit is configured to converge light rays in the first direction. The auxiliary imaging unit may be provided at any position between the object plane 10 and the first image plane 101. The auxiliary imaging unit may include a one-dimensional aperture stop for confining light rays from the object plane 10 in the second direction. For example, a one-dimensional aperture stop may be a slit grating. The one-dimensional aperture stop may be configured to be small enough to obtain a relatively large depth of focus in the second direction. The auxiliary imaging unit may also include an optical element disposed between the object plane 10 and the one-dimensional aperture stop for converging light rays in the second direction so that more light rays from the object plane 10 can pass through the one-dimensional aperture stop to increase the intensity of imaging light. Optionally, the optical element may convert the light beam from a point on the object plane to be approximately parallel in the second direction such that the divergence angle of the light beam after passing through the aperture stop is close to zero. For example, the optical element may be a lens or a group of lenses.

Figure 11A:
FIG. 11A shows a schematic diagram of adding a relay imaging unit according to an embodiment of the present invention.
Figure 11A:
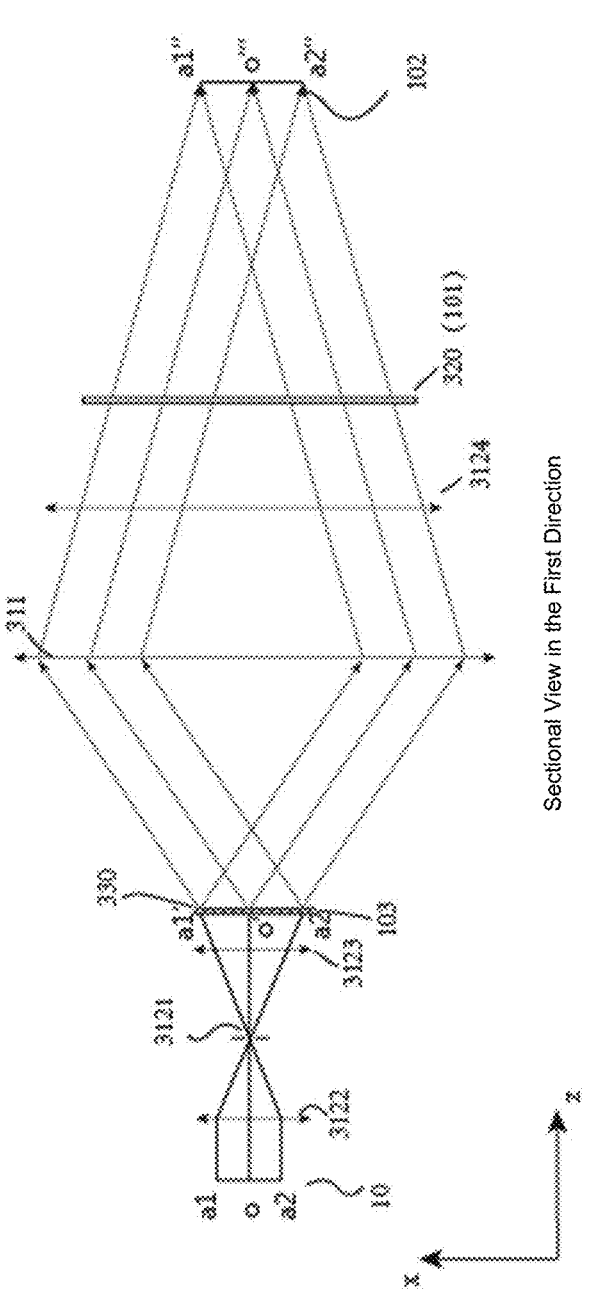
Figure 11A:
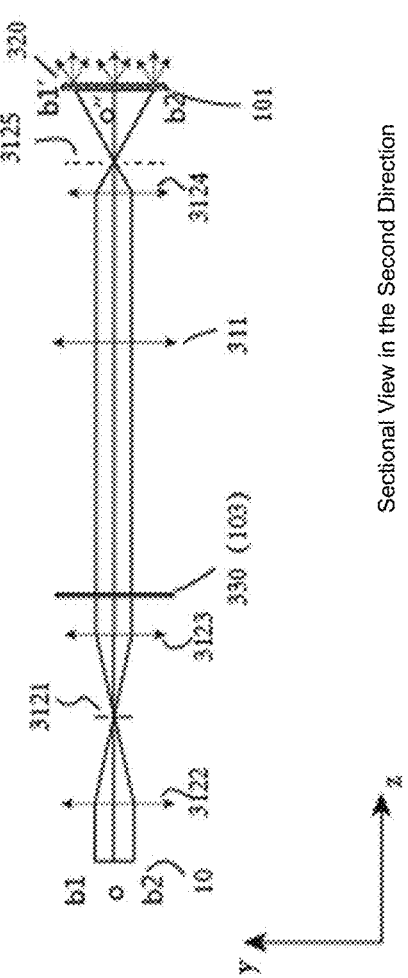
Figure 11B:
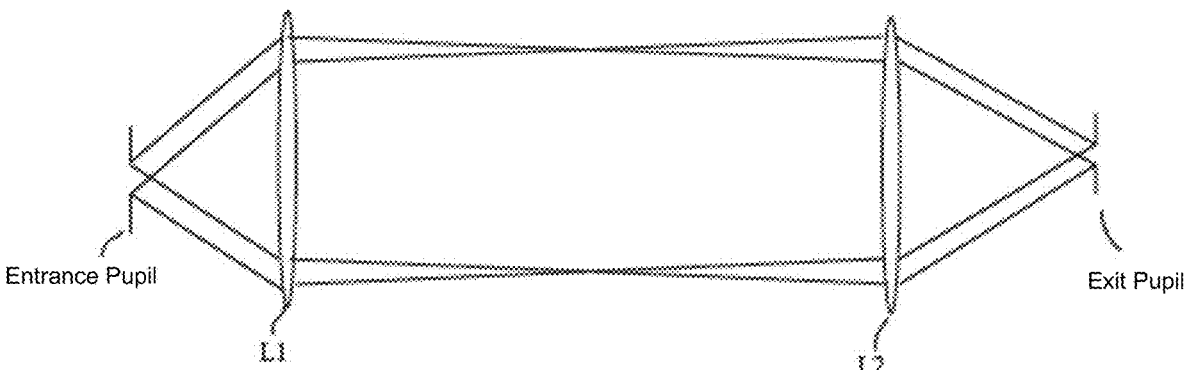
FIG. 11B shows a schematic diagram of an optional afocal system according to an embodiment of the present invention.

Optionally, the at least one imaging unit may include a plurality of optical elements constituting an afocal system in the second direction, such that parallel beams in the second direction with different incident angles entering the afocal system from the entrance pupil of the afocal system pass through the afocal system, and the exit beams at the exit pupil of the afocal system are still parallel beams in the second direction with different angles, as shown in FIG. 11B.

Figure 3:
FIG. 3 shows a schematic diagram of the principle of light propagation in a first direction and a second direction, respectively, of an optical imaging system 200 for floating display according to an alternative embodiment.

FIG. 3 shows a schematic diagram of the principle of light propagation in a first direction and a second direction, respectively, of an optical imaging system 200 for floating display according to the alternative embodiment. Certain details of the optical imaging system 200 are the same as those of the optical imaging system 100 described above with respect to FIGS. 1A-1B and will not be repeated here. The following mainly describes the differences of the optical imaging system 200.

The light beam propagation of the optical imaging system 200 is profiled in the first direction and the second direction, respectively. Referring to FIG. 3, in the first direction, light rays emitted from object points a1, o, a2 on the object plane 10 have a large divergence angle and are imaged as a1', o', a2' on the second image plane 102 by a main imaging unit 211. In the second direction, light rays emitted from object points b1, o, b2 are imaged on the first image plane 101 by an auxiliary imaging unit 212 (shown in FIG. 3 as an optical element 2122 and a slit diaphragm 2121) to form image points b1', o', b2'. The main diffusor 220 is placed within the depth of focus of the first image plane 101 (shown as being placed at the first image plane 101 as an example), and the light rays from the image points b1', o', b2' are scattered by the main diffusor 220 in the second direction, thereby forming a larger view-angle range in the second direction. In this way, an image-side aperture angle of the point on the object plane 10 imaged by the main imaging unit 211 in the first direction is relatively large (i.e., 20 degrees or more, preferably more than 30 degrees) to satisfy a binocular parallax condition, whereby a floating image can be formed at the second image plane 102 and has a first direction (e.g., horizontal direction) parallax and no second direction (e.g., vertical direction) parallax.

In the above-described alternative embodiment, the auxiliary imaging unit 212 may include only the one-dimensional aperture stop 2121 for pinhole imaging, thereby achieving the effect of floating display of the optical imaging system 200 and the optical element 2122 as shown in FIG. 2 is not necessary. However, in consideration of optical efficiency and imaging definition, the optical imaging system preferably includes the optical element 2122 (e.g., a lens or a lens group) to improve imaging. For example, the optical element 2122 may convert light beams from the point on the object plane 10 to be approximately parallel in the second direction such that the divergence angle of the light beam after passing through the aperture stop is close to zero. Note that, although the auxiliary imaging unit 212 is shown in FIG. 3 between the object plane 10 and the main imaging unit 211, a person skilled in the art can understand that the auxiliary imaging unit 212 may also be disposed between the main imaging unit 211 and the first image plane 101. Optionally, some of the optical elements in the auxiliary imaging unit 212 may be disposed between the object plane 10 and the main imaging unit 211 while other optical elements may be disposed between the main imaging unit 211 and the first image plane 101.

In particular, if the one-dimensional aperture stop 2121 is set to be small enough, a large depth of field can be obtained in the second direction. In this way, the main diffusor 220 may be placed anywhere between the one-dimensional aperture stop 2121 and the second image plane 102. Alternatively, the object plane 10 may be placed on the focal plane of the optical element 2122 so that approximately parallel light beams in the second direction may be obtained. In the process of light transmission, the main imaging unit does not change the divergence angle of light in the second direction, so the light beams emitted from the object point irradiate on the main diffusor and are approximately parallel in the second direction. In this embodiment, the object plane 10 may be a display surface of a self-emitting display or a projection surface generated by a projection-based display and the light emitted by the display (i.e., an image source) may be set according to the requirement of light divergence angle.

Optionally in some embodiments, the at least one imaging unit 110 may include a main imaging unit and an auxiliary imaging unit. The main imaging unit may be configured to converge light rays in the first direction. The auxiliary imaging unit may be configured such that the optical imaging system 100 further defines one or more relay image planes located along the optical axis between the object plane and the main diffusor. The optical imaging system 100 may also include an additional diffusor disposed within a depth of focus of a particular one of the one or more relay image planes for diverging light in the first direction. The auxiliary imaging unit may be configured to form the light beam from the point on the object plane 10 as a line image in the second direction at the particular relay image plane.

Figure 4A:
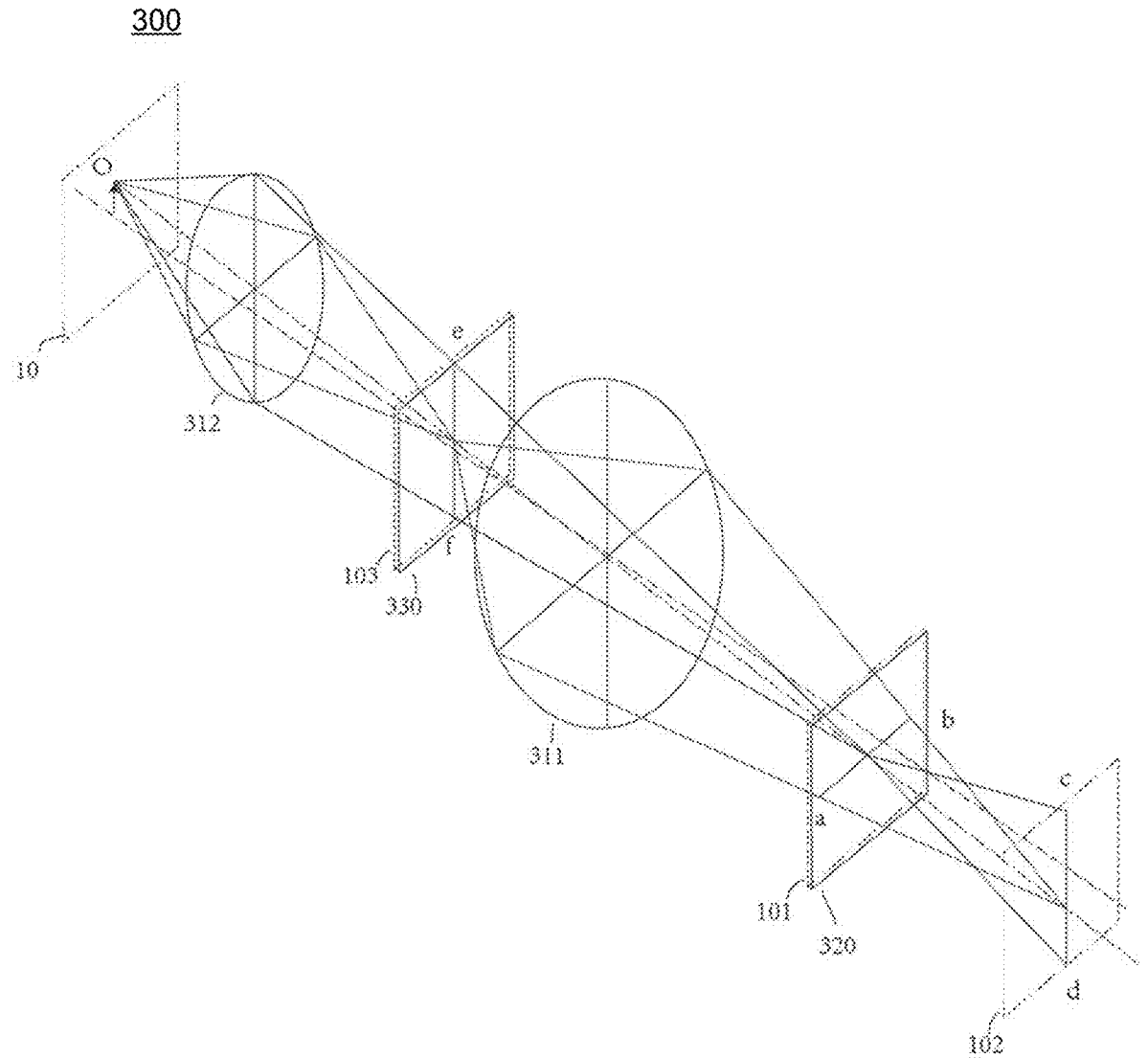
FIG. 4A shows a schematic diagram of the principle of an imaging process of an optical imaging system 300 for floating display according to an embodiment of the present invention.
Figure 4B:
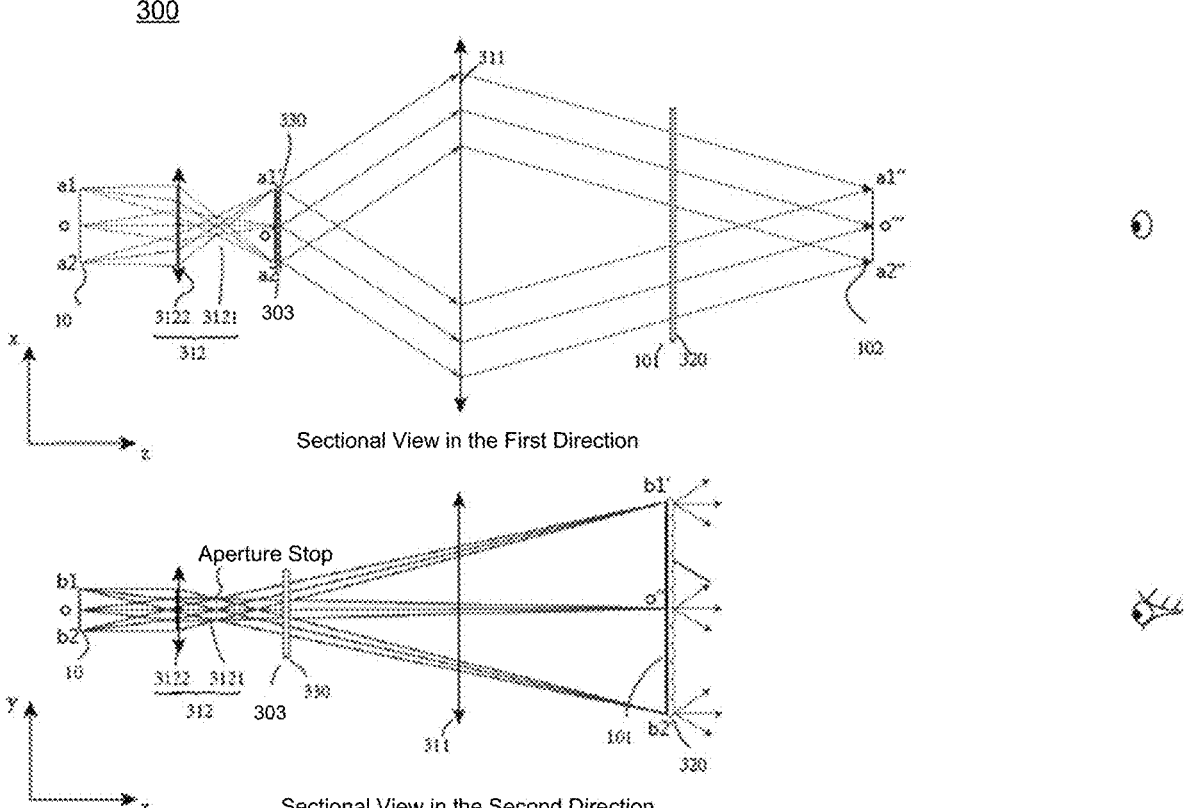
FIG. 4B shows a schematic diagram of the principle of light propagation in a first direction and a second direction, respectively, of an optical imaging system 300 for floating display according to an embodiment of the present invention.

FIG. 4A shows a schematic diagram of the principle of an imaging process of an optical imaging system 300 for floating display according to an embodiment of the present invention. FIG. 4B shows a schematic diagram of the principle of light propagation in a first direction and a second direction, respectively, of an optical imaging system 300 for floating display according to an embodiment of the present invention. Certain details of the optical imaging system 300 are the same as those of the optical imaging system 100 or 200 described above with respect to FIGS. 1A-3 and will not be repeated here. The following mainly describes differences of the optical imaging system 300.

As shown in FIG. 4A, in the optical imaging system 300, the imaging process of a light beam emitted from an object point on an object plane 10 passing through each image plane is as follows: the light beam passes through an auxiliary imaging unit 312 and is imaged as a line "ef" on a relay image plane 103 (i.e., the particular relay image plane); the additional diffusor 330 may be provided within the depth of focus of the relay image plane 103 and diverge light rays only in the first direction without changing the propagation direction of the light rays in the second direction, i.e., the line beam "ef" on the relay image plane is diverged in the first direction; the light beam diverged by the additional diffusor is converged in the first direction via the main imaging unit 311. Light beams emitted from object points on the object plane 10 converge on the first image plane 101 via the auxiliary imaging unit 312 into a line "ab", and the lines "ab" and "ef" are substantially orthogonal to each other and are orthogonal to the optical axis of the optical imaging system 300 respectively. The line beam "ab" is scattered in the second direction by the main diffusor 320 and finally converges into a line beam "cd" on the second image plane 102. The relay image plane 103 is associated with the setting of the additional diffusor 330 and is therefore referred to herein as the particular relay image plane. The exemplary optical imaging system 300 is characterized in that the light beam from the object point on the object plane is not imaged as a point but as a line on the first, second and relay image planes. Specifically, the line "ef" is an image formed from the object point "o" on the relay image plane 103, the line "ab" is an image formed from the object point "o" on the first image plane 101, and the line "cd" is an image formed from the object point "o" on the second image plane 102.

The beam propagation of the optical imaging system 300 is profiled in the first direction and the second direction, respectively. Referring to FIG. 4B, in the first direction, light rays emitted from object points a1, o, a2 on an object plane 10 are imaged as a1', o', a2' on a relay image plane 303 through auxiliary imaging unit 312 (shown as including an optical element 3122 and an aperture stop 3121 as an example). The additional diffusor 330 is placed within the depth of focus of the relay image plane 303 (shown as being placed at the relay image plane 303 as an example), and the light rays of the image points a1', o', a2' are scattered in the first direction by the additional diffusor 330 and imaged at the second image plane 102 by the main imaging unit 311 to form the image points a1'', o''', a2''. In the second direction, light rays emitted from object points b1, o, b2 are imaged on the first image plane 101 by the auxiliary imaging unit 312 to form image points b1', o', b2'. The main diffusor 320 is placed within the depth of focus of the first image plane 101 (shown as being placed at the first image plane 101 as an example), and the light rays of the image points b1', o', b2' are scattered by the main diffusor 320 in the second direction, thereby forming a larger view-angle range in the second direction. In this way, the image-side aperture angle of the points on the object plane 10 imaged by the main imaging unit 311 in the first direction is relatively large (i.e., 20 degrees or more, preferably more than 30 degrees) to satisfy the binocular parallax condition, whereby a floating image with the first direction parallax but without the second direction parallax can be formed at the second image plane 102.

The object points on the object plane 10 correspond to the line segments on the relay image plane 303, the first image plane 101 and the second image plane 102, respectively. Since the optical path is reversible, one line segment on the relay image plane 303, the first image plane 101 or the second image plane 102 is also imaged as one point on the object plane, forming a certain regular mapping relationship, which is referred to as "optical conjugation" in this specification.

Note that, although the auxiliary imaging unit 312 is shown in FIG. 4 between the object plane 10 and the main imaging unit 311, a person skilled in the art can understand that the auxiliary imaging unit 312 may also be disposed between the main imaging unit 311 and the first image plane 101. Alternatively, some of the optical elements in the auxiliary imaging unit 312 may be disposed between the object plane 10 and the main imaging unit 311, while other optical elements may be disposed between the main imaging unit 311 and the first image plane 101.

In some embodiments of the present invention, the auxiliary imaging unit 312 is not necessarily included, depending on the nature of the display source (i.e., the light source) that cooperates with the optical imaging system 300. For example, in a case where the display source is a laser scanning or parallel light source, the auxiliary imaging unit 312 may be omitted. Alternatively in other embodiments of the present invention, the auxiliary imaging unit 312 may be integrated in the display source and therefore not included in the optical imaging system 300.

Figure 5:
FIG. 5 shows a schematic diagram of the principle of light propagation in a first direction and a second direction, respectively, of an optical imaging system 400 for floating display according to an embodiment of the present invention.

FIG. 5 shows a schematic diagram of the principle of light propagation in a first direction and a second direction, respectively, of an optical imaging system 400 for floating display according to an embodiment of the present invention. Certain details of the optical imaging system 400 are the same as those of the optical imaging system 300 described above with respect to FIGS. 4A-4B and will not be repeated here. The following mainly describes differences of the optical imaging system 400.

The optical imaging system 400 according to an embodiment of the present invention can be used in a projection manner. For example, the projection plane of the projection display source may be set as the object plane of the optical imaging system 400.

The optical imaging system 400 may include an auxiliary imaging unit 412, an additional diffusor 430, a main imaging unit 411 and a main diffusor 420. The auxiliary imaging unit 412 may include an aperture stop 4121 and an optical element 4122 (e.g., a lens or a lens group), and light emitted from an object point on the object plane 10 is collimated to be approximately parallel by the optical element 4122, and passes through the aperture stop 4121, which is configured to be sufficiently small (e.g., less than 200 um). In the first direction, light rays emitted from object points a1, o, a2 on the object plane are imaged as a1', o', a2' on the relay image plane 403 through the optical element 4122 and the aperture stop 4121. The additional diffusor 430 is placed at the relay image plane 403, and the light of the image points a1', o', a2' is scattered in the first direction by the additional diffusor 430, so that the scattered light has a certain divergence angle (e.g. 30 degrees to 180 degrees), and is imaged at the second image plane 102 by the main imaging unit 411 to form the image points a1", o'", a2". In the second direction, light rays emitted from object points b1, o, b2 are imaged on the first image plane 101 through the optical element 4122 and the aperture stop 4121 to form image points b1', o', b2'. In this case, the auxiliary imaging unit 412 causes the light beam emitted from the object point to be parallel light beams in the second direction and the divergence angle to be close to zero, and the main imaging unit does not change the divergence angle of the light beam in the second direction during light transmission, so that the light beams emitted from the object point are approximately parallel light beams in the second direction when irradiated on the main diffusor. The optical imaging system has an infinite depth of focus in the second direction and the first image plane 101 may be at any position between the main imaging unit 411 and the second image plane 102. The main diffusor 420 is placed at the first image plane 101, and the light rays of the image points b1', o', b2' are scattered by the main diffusor 420 in the second direction, thereby forming a larger view-angle range in the second direction. In this way, the image-side aperture angle of the points on the object plane 10 imaged by the main imaging unit 411 in the first direction is relatively large (i.e., 20 degrees or more, preferably more than 30 degrees), satisfying the binocular parallax condition, whereby a floating image with the first direction parallax but without the second direction parallax can be formed at the second image plane 102.

Optionally, in the optical imaging system 400, the object plane 10 is arranged at the focal plane of the optical element 4122, and the light emitted from object points at different positions of the object plane 10 is collimated into parallel light of different angles through the optical element 4122. The aperture stop 4121 is arranged at the focus position on the other side of the optical element 4122, and the parallel light of different angles converges at the focus position, passes through the aperture stop 4121, and is projected onto the diffusor. In this way, the size of the aperture stop 4121 can be reduced to a very small size so that the light beam from the object point is projected onto the diffusor to form pixel points. In this case, since the relay image plane and the first image plane have an infinite depth of focus, the main diffusor and the additional diffusor can be placed at any position within the depth of focus of the corresponding image plane. In addition, the main diffusor and the additional diffusor may be placed at an angle (e.g., an angle that is not 90 degrees) with respect to the optical axis, thereby forming a technical effect of imaging the floating image at a certain angle with respect to the main diffusor.

Note that, the auxiliary imaging unit 412 may include only the aperture stop 4121 to perform pinhole imaging so that the effect of floating display of the optical imaging system 400 can be achieved without the optical element 4122 as shown in FIG. 5. However, in consideration of optical efficiency and imaging definition, the optical imaging system preferably includes a lens to further improve imaging.

Figure 6:
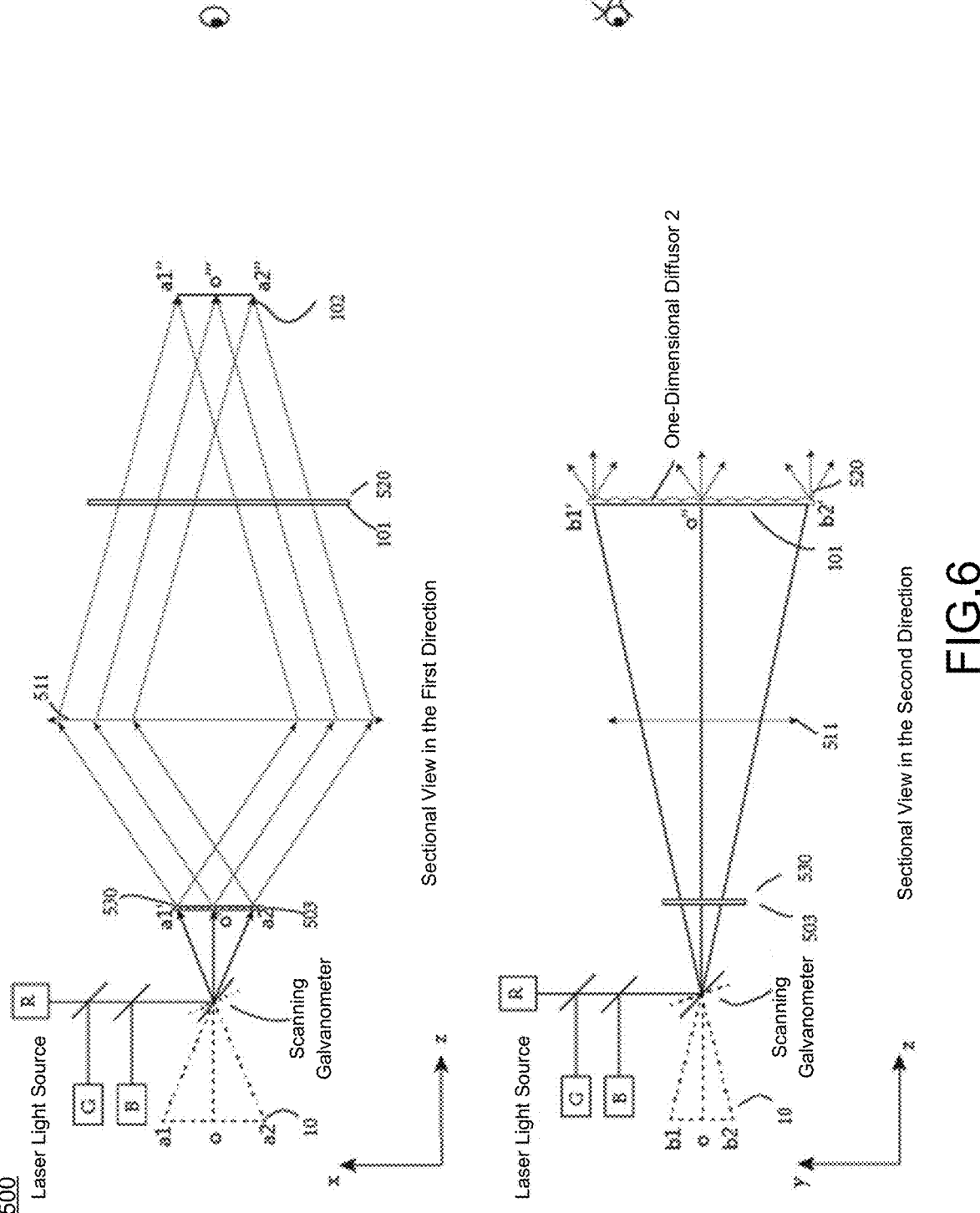
FIG. 6 shows a schematic diagram of the principle of light propagation in a first direction and a second direction, respectively, of an optical imaging system 500 for floating display according to an embodiment of the present invention.

FIG. 6 shows a schematic diagram of the principle of light propagation in a first direction and a second direction, respectively, of an optical imaging system 500 for floating display according to an embodiment of the present invention. Certain details of the optical imaging system 500 are the same as those of the optical imaging system 300 described above with respect to FIGS. 4A-4B and will not be repeated here. The following mainly describes differences of the optical imaging system 400.

The optical imaging system 500 according to an embodiment of the present invention can be used in a laser scanning manner. The optical imaging system 500 may further define a relay image plane 503 and includes an additional diffusor 530, a main imaging unit 511 and a main diffusor 520. The additional diffusor 530 may be provided at the relay image plane 503. The light beam from the laser light source may be scanned on the relay image plane 503 of the optical imaging system 500 via a two-dimensional scanning galvanometer.

Referring to FIG. 6, parallel laser beams emitted by the RGB laser light source form image points a1', o', a2' on the additional diffusor 530 through a two-dimensional scanning galvanometer. The beam at the image points a1', o', a2' are scattered in a first direction by the additional diffusor 530, and then converged by the main imaging unit 511 to form the image a1", o'", a2" on the second image plane 102. In the second direction, the laser beam forms image points b1', o', b2' on the main diffusor 520 by the two-dimensional scanning galvanometer, and is then scattered by the main diffusor 520, allowing a larger view-angle in the second direction. In the process of light transmission, the main imaging unit does not change the light divergence angle in the second direction, so the light beam emitted from the object point irradiates on the main diffusor and is approximately parallel in the second direction. In particular, the reverse extension lines of the scanning laser beam can be considered to form a virtual object plane 10, i.e., a1, o, a2 in the first direction and b1, o, b2 in the second direction. In this way, the image-side aperture angle of points on the object plane 10 imaged by the main imaging unit 511 in the first direction is relatively large (i.e., 20 degrees or more, preferably more than 30 degrees), satisfying the binocular parallax condition, whereby a floating image with the first direction parallax but without the second direction parallax can be formed at the second image plane 102.

Figure 7:
FIG. 7 shows a schematic diagram of the principle of light propagation in a first direction and a second direction, respectively, of an optical imaging system 600 for floating display according to an embodiment of the present invention.

FIG. 7 shows a schematic diagram of the principle of light propagation in a first direction and a second direction, respectively, of an optical imaging system 600 for floating display according to an embodiment of the present invention. Certain details of the optical imaging system 600 are the same as those of the optical imaging system 300 described above with respect to FIGS. 4A-4B and will not be repeated here. The following mainly describes differences of the optical imaging system 600.

The optical imaging system 600 according to an embodiment of the present invention can be used in conjunction with a parallel-light source. Referring to FIG. 7, a parallel-light source illuminates on the spatial light modulator (which may be considered as being at the object plane 10) to form pixels a1, o, a2 (which may be considered as object points a1, o, a2 on the object plane 10) Similar to the imaging principle described with reference to FIGS. 4A-6, the pixels a1, o, a2 are projected in parallel on the relay image plane 603 as image points a1', o', a2', which are scattered in the first direction by the additional diffusor 630 and are imaged on the second image plane 102 through the main imaging unit 611 to form corresponding image points a1", o''', a2"; the pixels b1, o, b2 on the spatial light modulator have image points b1', o', b2' on the first image plane 101 and are then scattered in the second direction by the main diffusor 620, allowing a larger view-angle in the second direction. In the process of light transmission, the main imaging unit does not change the light divergence angle in the second direction, so the light beam emitted by the object point irradiates on the main diffusor and is approximately parallel in the second direction. In this way, the image-side aperture angle of the points on the object plane 10 imaged by the main imaging unit 611 in the first direction is relatively large (i.e., 20 degrees or more, preferably more than 30 degrees), satisfying the binocular parallax condition, whereby a floating image with the first direction parallax but without the second direction parallax can also be formed at the second image plane 102.

A spatial light modulator is a device that modulates the spatial distribution of light waves. Generally speaking, the spatial light modulator is composed of many independent units, which are arranged in one-dimensional or two-dimensional arrays in space. Each unit is independently controlled by optical signals or electrical signals, and changes its optical properties according to the signal, so as to modulate the light waves illuminated on it.

Figure 8:
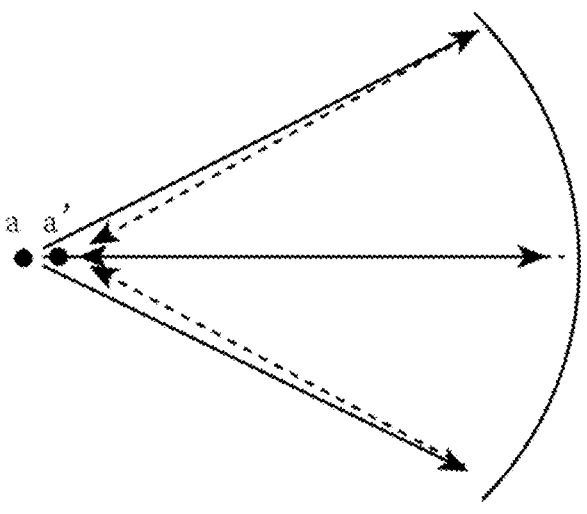
FIG. 8 shows an example element of an imaging unit according to an embodiment of the present invention.
Figure 8:
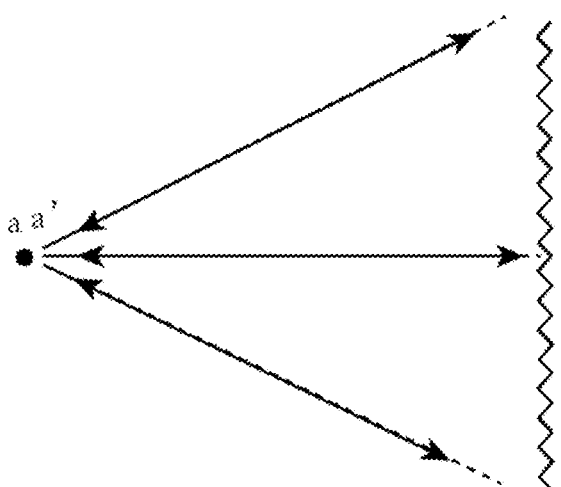

Referring to FIG. 8, in the above-described optical imaging system, at least one imaging unit (in particular the main imaging unit) located between the main diffusor and the additional diffusor may include a lens, a mirror, and/or a one-dimensional retroreflector (with a V-shaped groove angle of 90 degrees) to adjust light rays in the first direction. In the case of using a lens/mirror, the optical imaging system can have an image magnification effect, while in the case of using a one-dimensional retroreflector alone, the optical imaging system does not have an image magnification effect.

Figure 9:
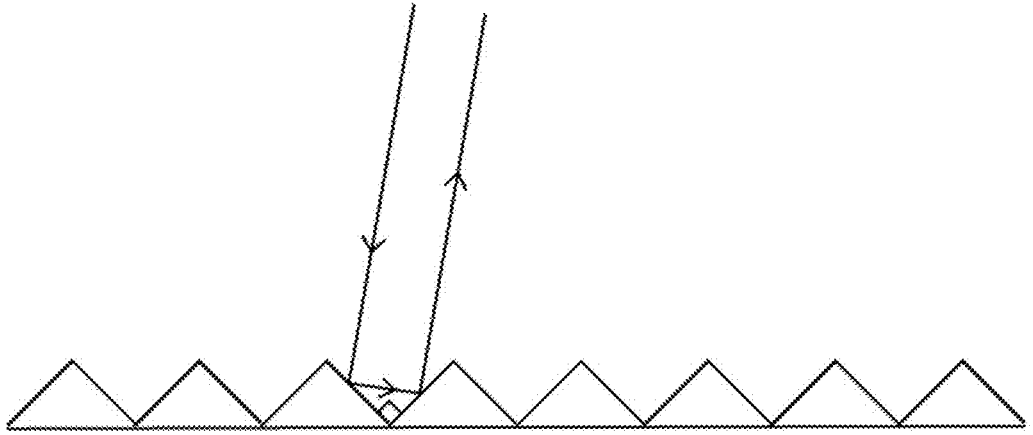
FIG. 9 shows an example of a one-dimensional retroreflector according to an embodiment of the present invention.
Figure 9:
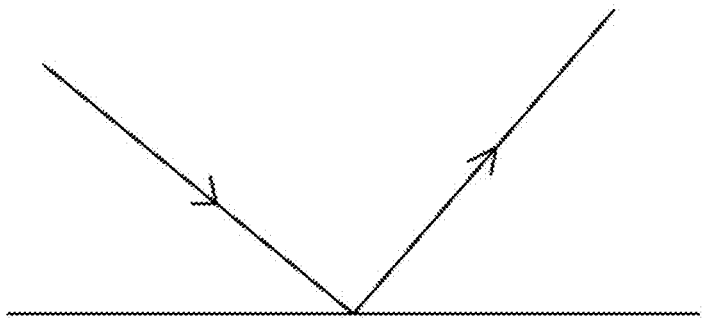

Referring to FIG. 9, in some embodiments of the present invention, the one-dimensional retroreflector may be a microprism array structure, the surface of the microprisms is coated with a reflective layer, and the angle between the V-shaped grooves of the microprisms is 90 degrees. The principle of the one-dimensional retroreflector is that any light irradiated on the surface of the one-dimensional retroreflector is reflected at the original angle in one direction and is specularly reflected in another direction. Alternatively, in other embodiments of the present invention, the one-dimensional retroreflector may have other configurations such as a holographic configuration.

Figure 10A:
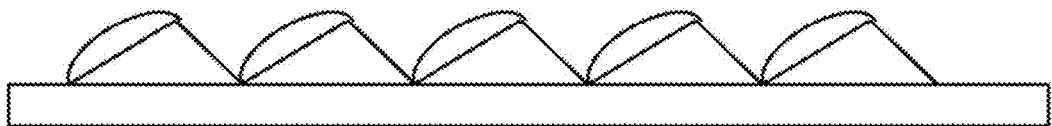
FIG. 10A shows an example of a diffusor according to an embodiment of the present invention.

Optionally, as shown in FIG. 10A, the diffusor may be a directional diffusor composed of a prism array and a cylindrical mirror array to better control the angle of light emitted from the diffusor and improve the display quality.

Figure 10B:
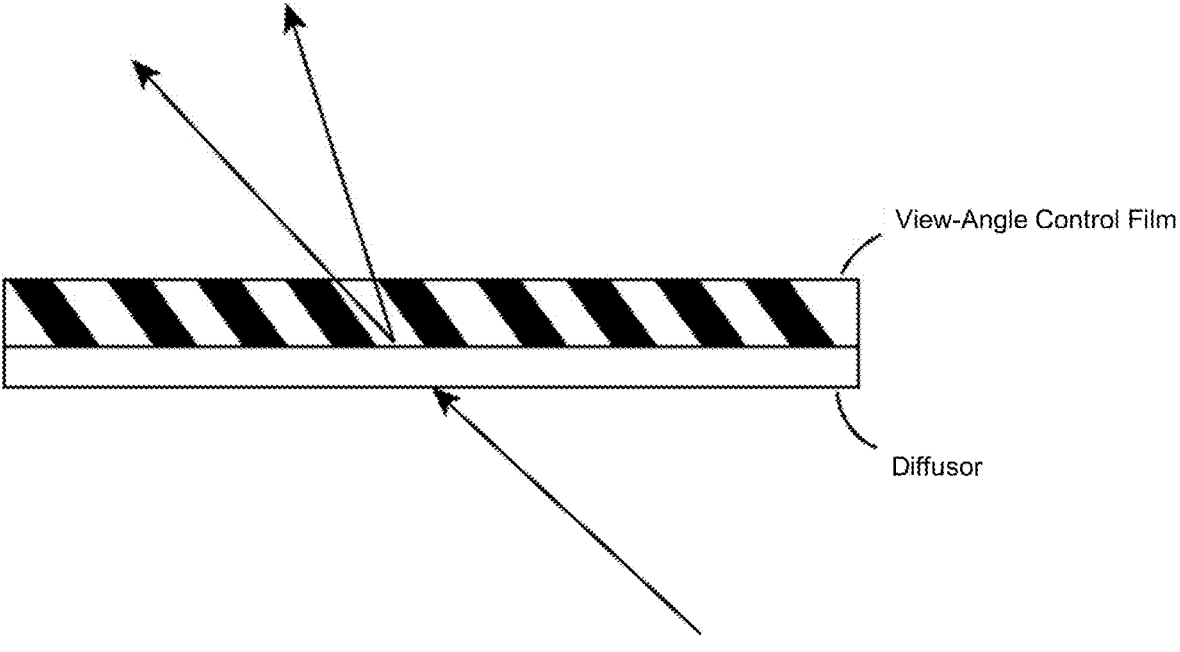
FIG. 10B shows an example of a louver mask structure according to an embodiment of the present invention.

Optionally, the louver mask structure may be arranged on the light emitting side of the diffusor for controlling the angle of light emitted from the diffusor. For example, referring to FIG. 10B, a view-angle control film with the louver structure can be superimposed on the diffusor to control the angle of light emitted from the diffusor and improve the display quality.

Optionally, the size of the optical imaging system 300 or 400 may be compressed in the second direction in order to further improve the slim design of the system. For example, a relay imaging unit may be added in the second direction. Referring to FIG. 11A, for example, for the optical imaging system 300 described above, by adding optical elements 3123 and 3124 (such as a cylindrical lens pair) between the object plane 10 and the first image plane 101, the aperture stop 3121 and the optical elements 3123 and 3124 constitute an afocal system (a telescopic system) in the second direction, wherein the aperture stop 3121 is the entrance pupil position of the afocal system, and the position 3125 is the exit pupil position of the afocal system. The function of the afocal system is that after the parallel light beams in the second direction passing through the afocal system, the exit light beams in the exit pupil position are still parallel light beams in the second direction with different angles, as shown in FIG. 11B. Therefore, the beam emitted from the object point irradiates on the main diffusor and is approximately parallel in the second direction. With this design, the light in the second direction can be transmitted in a very narrow space. In this way, the optical imaging system 300 or 400 may further define more relay image planes in addition to the particular relay image planes described above for the purpose of providing the additional diffusor within its depth of focus.

Similar to the optical imaging systems above, the invention also provides a corresponding floating display device. The floating display device includes an optical imaging system as described above and an image display unit configured to emit light constituting an image toward an object plane of the optical imaging system.

Optionally, the floating display device further includes a spatial light modulator disposed at the object plane for modulating the parallel light from the image display unit.

The image display unit may be a direct-view display source, and the display surface of the image display unit may be provided at the object plane. Alternatively, the image display unit may be a projection-based display source and the projection plane of the image display unit may be provided at the object plane.

Hereinafter, several examples of the floating display device according to the embodiment of the present invention will be described.

First Example

Figure 12A:
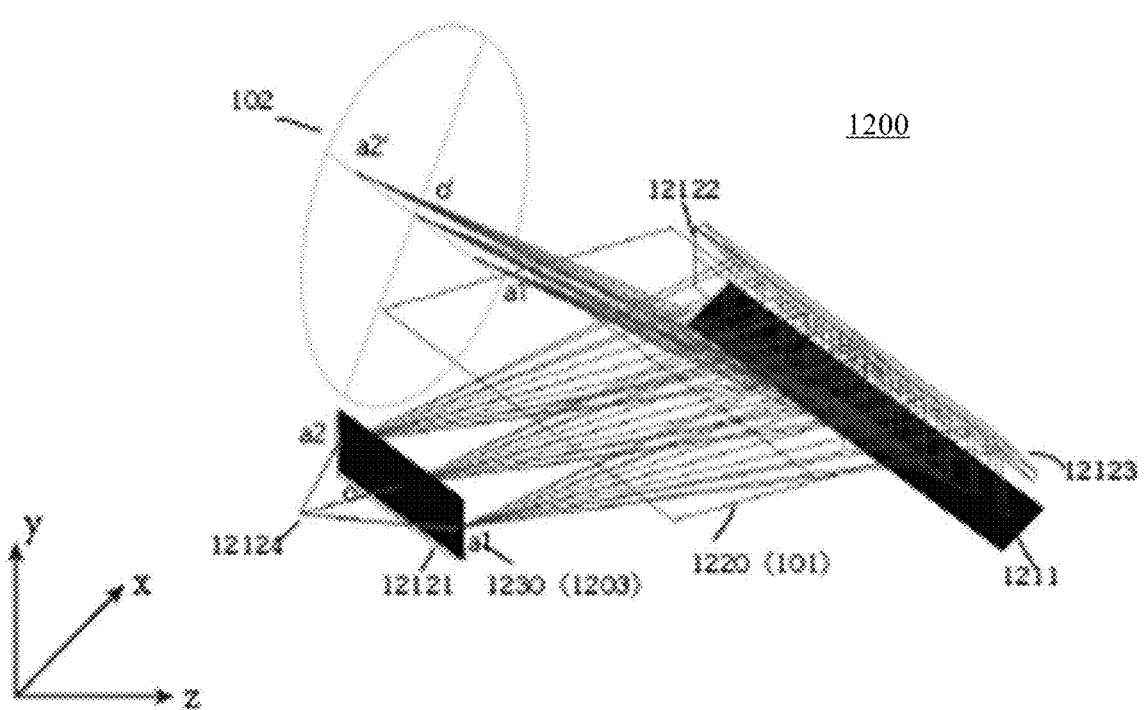
FIGS. 12A-12C show schematic diagrams of a floating display device according to a first example of the present invention.
Figure 12B:
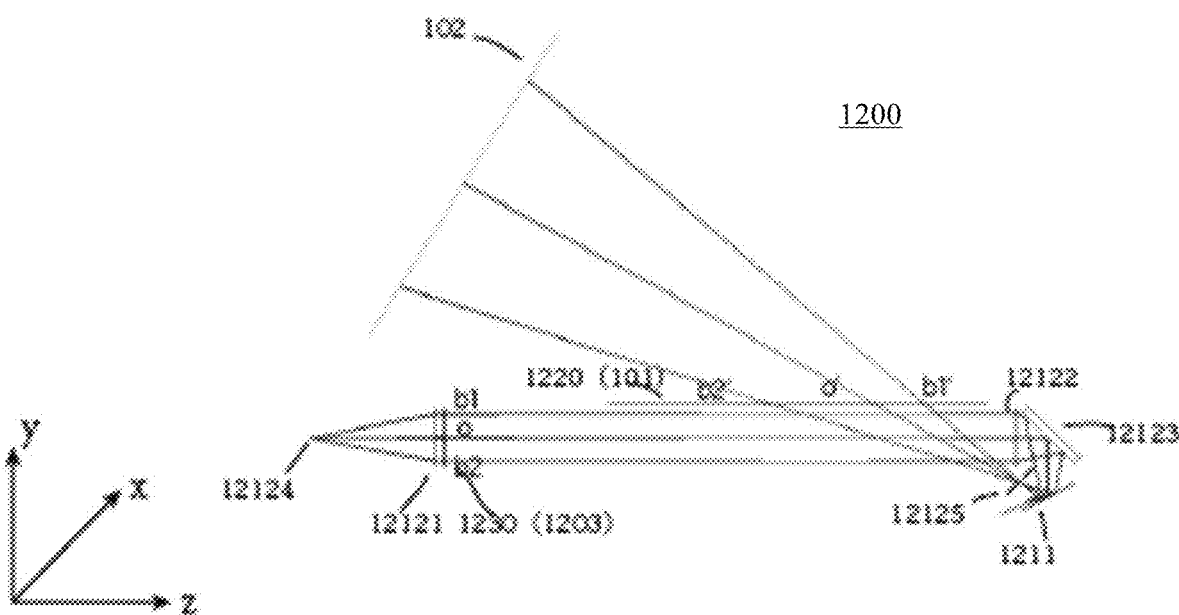
Figure 12C:
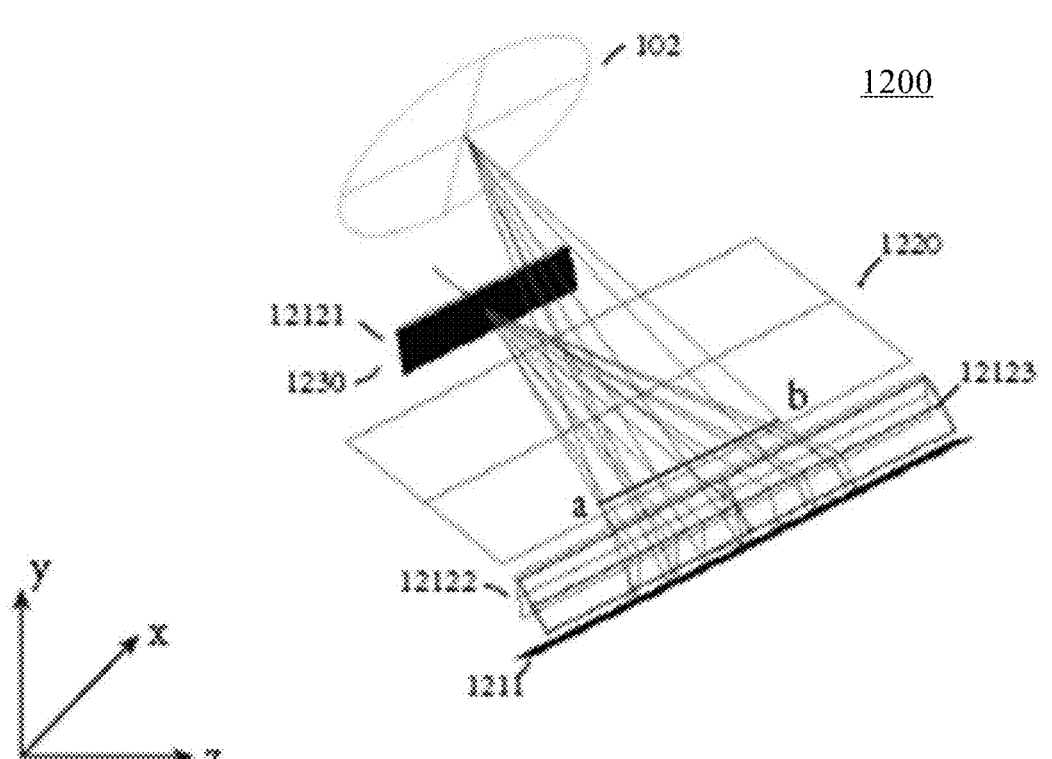
Figure 12C:
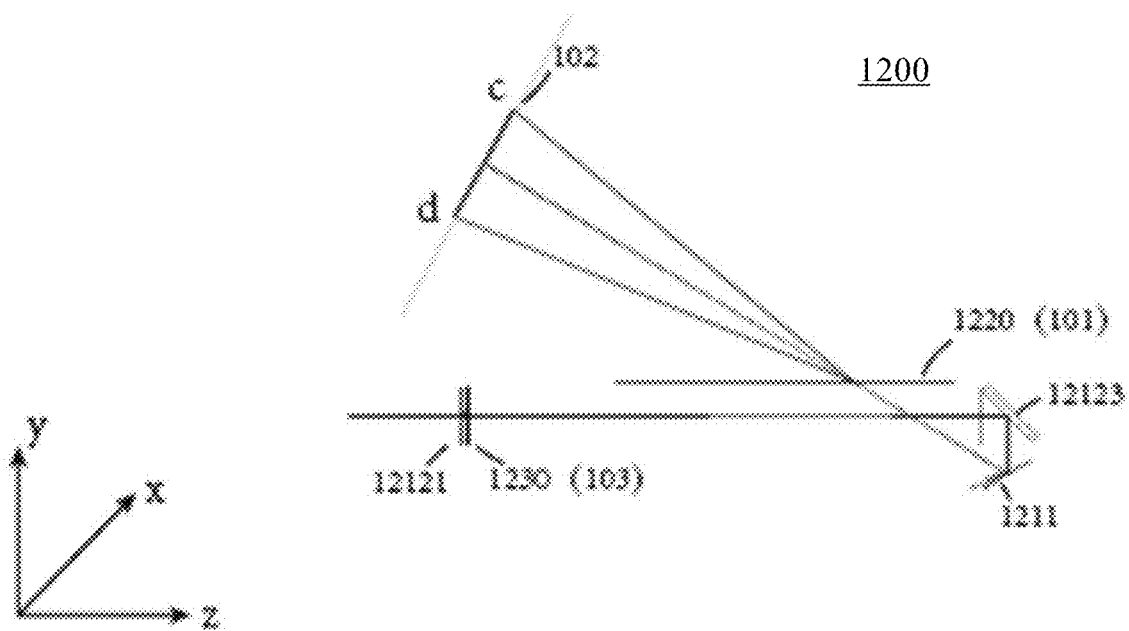

FIGS. 12A-12C show schematic diagrams of a floating display device according to a first example of the present invention in which an optical imaging system 1200 for floating display is used in conjunction with a laser MEMS scan projection. Certain details of the optical imaging system in the floating display device according to the first example are the same as the optical imaging system 400 or 500 described above with respect to FIG. 5 or 6 and will not be repeated here. The following mainly describes differences of the optical imaging system 1200 of the first example.

In this example, the optical imaging system 1200 may include an auxiliary imaging unit, an additional diffusor 1230, a main imaging unit 1211 and a main diffusor 1220. The auxiliary imaging unit 1212 may include a first lens 12121, a second lens 12122, and a plane mirror 12123.

As shown in FIGS. 12A and 12B, the imaging process of a light beam emitted from an object point on the virtual object plane 10 passing through the optical imaging system 1200 is as follows: the laser beam propagates parallel in the horizontal direction x and the vertical direction y after passing through the lens 12121; the parallel laser beams are diverged in the horizontal direction x by an additional diffusor 1230 (i.e., at the relay image plane 1203); the optical elements 12121 and 12122 form an afocal system (a telescopic system) in the second direction, position 12124 is the pupil entry position of the afocal system (galvanometer position of MEMS scan projection), position 12125 is the exit pupil position of the system, the function of the afocal system is that after the parallel light beams in the second direction with different incident angles passing through the afocal system, the exit light at the exit pupil position is still the parallel light beams in the second direction with different angles, so the light beams emitted by the object point irradiate on the main diffusor and are approximately parallel in the second direction; the main diffusor 1220 (i.e., at the first image plane 101) scatters light rays only in the direction y (corresponding to the vertical direction with respect to the optical axis of the optical system 1200) without changing the transmission of light rays in the x direction (corresponding to the horizontal direction with respect to the optical axis of the optical system 1200); the horizontally divergent light is reflected by the one-dimensional retroreflector 1211 and then passes through the main diffusor 1220 to converge on the floating image plane (i.e., the second image plane 102); after being converged in the vertical direction y by a second lens (i.e., a cylindrical lens), the vertically transmitted light is reflected by the plane mirror 12123 and the one-dimensional retroreflector 1211 to propagate toward the main diffusor 1220 and then scattered by the main diffusor 1220, forming a larger field angle in the vertical direction y. As shown in FIG. 12C, the light emitted from the virtual object point is scattered in the horizontal direction x by the additional diffusor 1230, reflected by the plane mirror 12123 and the one-dimensional retroreflector 1211, and imaged as a straight line "ab" in the horizontal direction on the first image plane 101; scattered in the vertical direction on the main diffusor 1220 so as to be imaged as a straight line "cd" in the vertical direction on the second image plane 102. In this way, the image-side aperture angle of the points on the object plane 10 imaged by the main imaging unit 1211 in the first direction is relatively large (i.e., 20 degrees or more, preferably more than 30 degrees), satisfying the binocular parallax condition, whereby a floating image with horizontal parallax but without vertical parallax can be formed at the floating image plane (i.e., the second image plane 102).

Second Example

Figure 13:
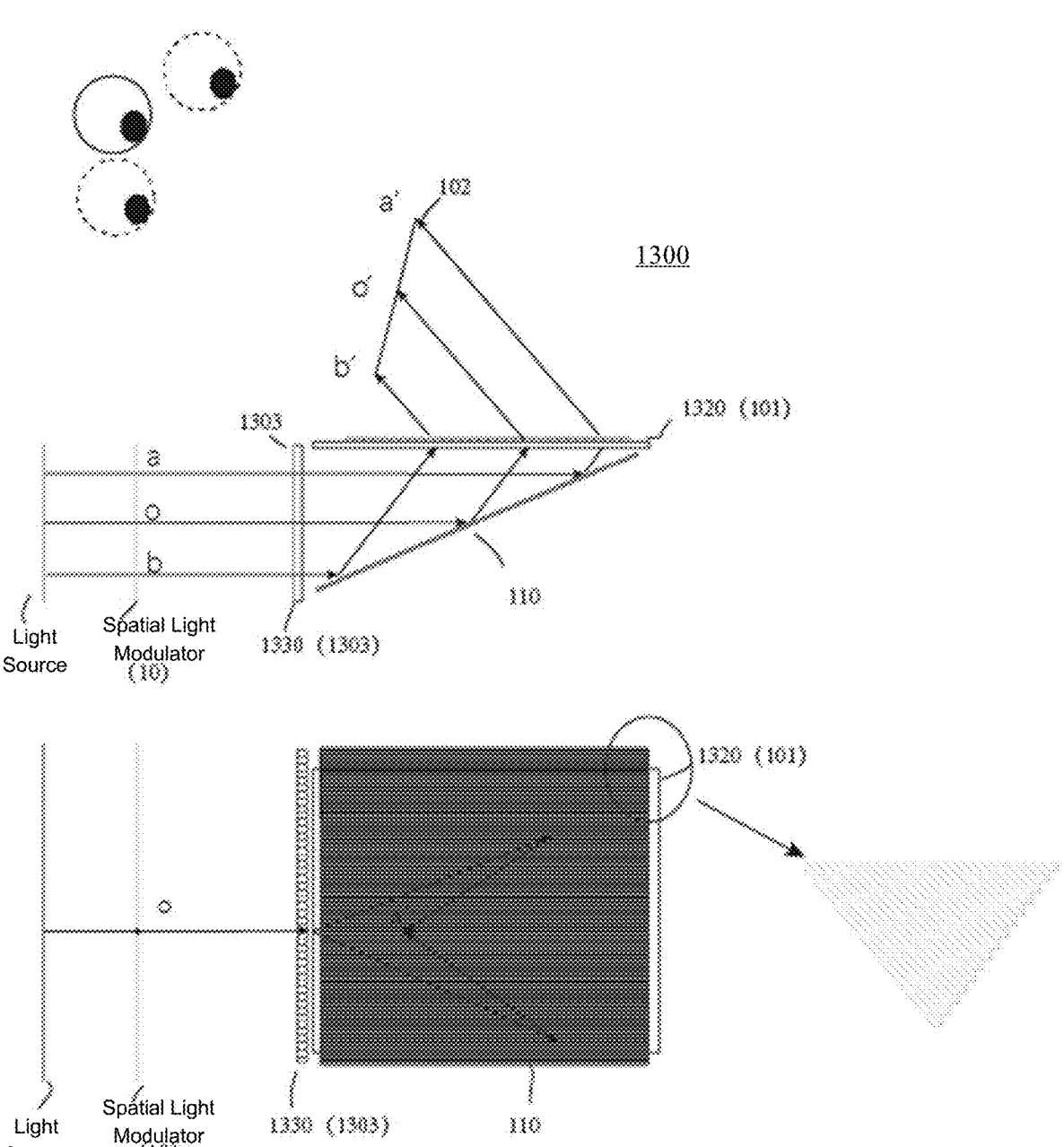
FIG. 13 shows a schematic side and top view of a floating display device according to a second example of the present invention.

FIG. 13 shows a schematic side view and a top view of a floating display device according to a second example of the present invention in which an optical imaging system 1300 for floating display is used in conjunction with a parallel light projection. Certain details of the optical imaging system 1300 in the floating display device according to the second example are the same as the optical imaging system 600 described above with respect to FIG. 7 and will not be repeated here. The following mainly describes the differences of the second example.

As shown in FIG. 13 the floating display device includes a parallel-light source, a spatial light modulator and an optical imaging system 1300. In this example, the spatial light modulator may be a transmissive display screen such as an LCD. The plane on which the spatial light modulator is located can be regarded as the object plane 10. The optical imaging system 1300 may include an additional diffusor 1330, an imaging unit 110 and a main diffusor 1320 along its optical axis. The imaging unit 110 may include a one-dimensional retroreflector disposed on the optical axis between the additional diffusor 1330 and the main diffusor 1320.

The parallel-light source irradiates on the spatial light modulator to form pixels a, o, b (which may be regarded as object points a, o, b on the object plane). The parallel light is scattered on the relay image plane 1303 by the additional diffusor 1330 in the horizontal direction orthogonal to the optical axis, and is steered by the one-dimensional retroreflector to irradiate on the first image plane 101. The main diffusor 1320 scatters the light in the vertical direction orthogonal to the optical axis, allowing a larger view-angle in the vertical direction. In this way, the image-side aperture angle of the points on the object plane 10 imaged by the main imaging unit 110 in the first direction is relatively large (i.e., 20 degrees or more, preferably more than 30 degrees), satisfying the binocular parallax condition, whereby a floating image (a', o', b') with horizontal parallax but without vertical parallax can be formed at the second image plane 102.

Third Example

Figure 14:
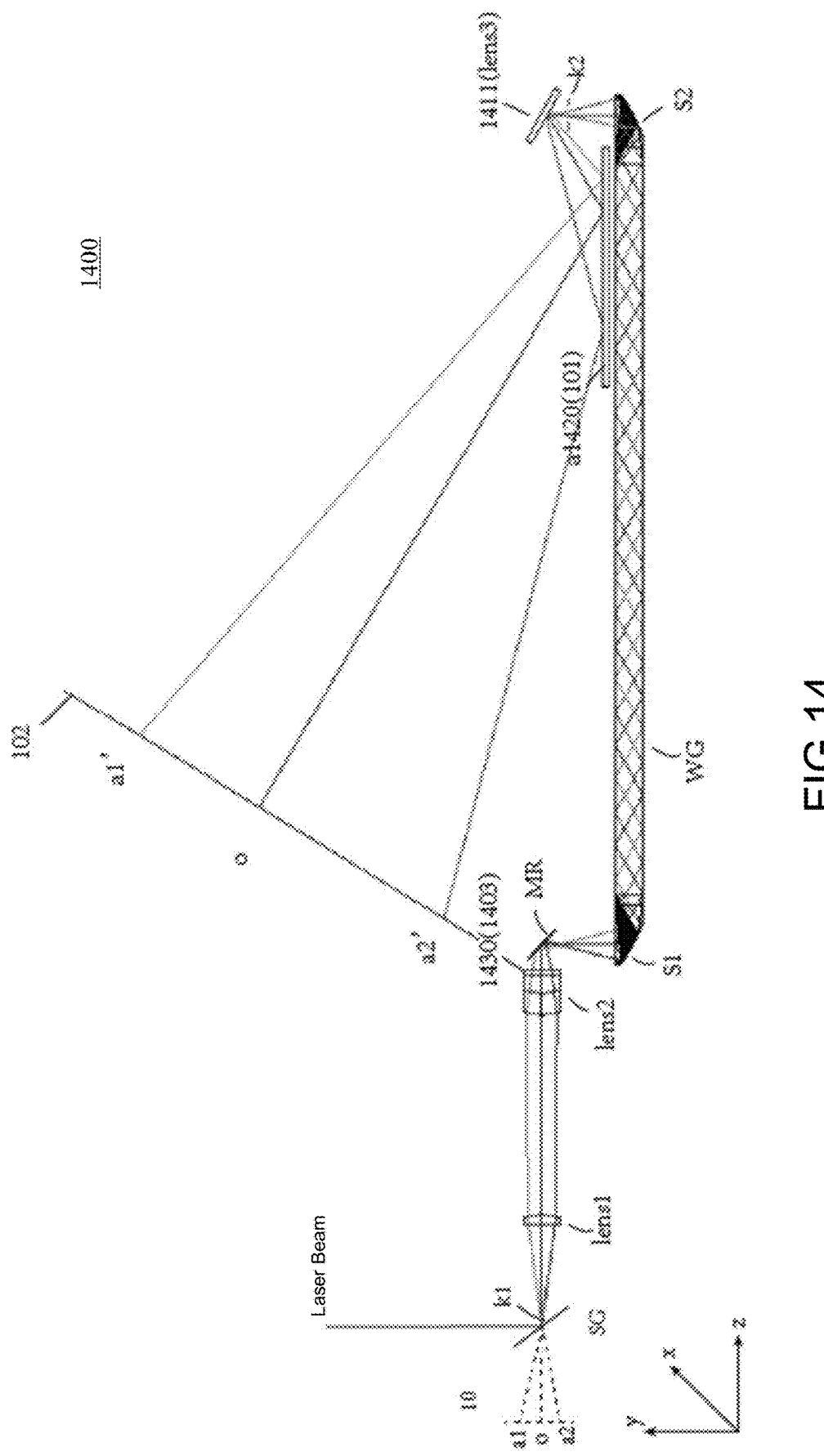
FIG. 14 shows a schematic diagram of a floating display device according to a third example of the present invention.

FIG. 14 shows a schematic diagram of a floating display device according to a third example of the present invention in which light is transmitted using a waveguide between an additional diffusor and a main diffusor. Certain details of the imaging process of the optical imaging system 1400 of the floating display device according to the third example are the same as the imaging process described above with respect to FIGS. 4A-5 and will not be repeated here. The following mainly describes the differences of the third example.

In this example, the floating display device includes an optical imaging system 1400 for floating display, an RGB laser light source, and a scanning galvanometer configured to guide light constituting an image from the RGB laser light source to the optical imaging system 1400.

The optical imaging system 1400 may define an object plane 10, a relay image plane 1403, a first image plane 101 and a second image plane 102 along its optical axis. The optical imaging system 1400 includes an auxiliary imaging unit disposed between the object plane 10 and the first image plane 101 on the optical path; an additional diffusor 1430 disposed at the relay image plane 1403; a main imaging unit arranged between the object plane 10 and the first image plane 101 on the optical path; and a main diffusor 2 disposed at the first image plane 101.

The auxiliary imaging unit may include a lens1 (lens1), a lens 2 (lens2), a reflector MR, and an optical waveguide WG, wherein the optical waveguide WG is a flat structure made of glass or PMMA, in which light rays are continuously transmitted by total reflection; the lens2 is a toric mirror with different focal lengths in x and y directions, and the s1 and s2 surfaces of the optical waveguide are free-form surfaces. The main imaging unit 1411 may include a lens 3 (lens3) which is a cylindrical Fresnel lens. The additional diffusor 1430 diverges light rays only in the horizontal direction orthogonal to the optical axis without changing the propagation direction of light rays in the vertical direction orthogonal to the optical axis. The main diffusor 1420 is a reflective diffusor that diverges light rays in the vertical direction.

Specifically, in the optical system 1400, the light beam propagation direction is the direction of the optical axis, the first direction and the second direction are two directions orthogonal to the optical axis, and the first direction and the second direction are orthogonal to each other.

The RGB laser light source vibrates in the first direction and the second direction through the scanning galvanometer SG, the laser beam is projected at different angles, first through the lens1 (lens1), which modulates the light beams with different angles in the second direction into parallel light beams transmitted along the optical axis, and then through the lens 2 (lens2) which is a toric lens having a focal length of f1 in the first direction and a focal length of f2 in the second direction. The lens 2 (lens2) modulates light beams of different angles in the first direction into parallel light beams propagating along the optical axis, re-converges the light beams in the second direction, and the propagation angle of the light beams is steered by the mirror MR and the light beam then enters into the optical waveguide WG. The lens 2 (lens2) is a plano-convex lens, and optionally, the additional diffusor 1430 is a cylindrical lens array, which is attached to the surface of the lens 2 (lens2). The scanning beam irradiates on the diffusor 1430 to diverge light in the first direction without changing the transmission of light in the second direction, and the plane where the diffusor 1430 is located is a relay image plane 1403. The light incident into the optical waveguide is modulated by a free-form surface S1 in the waveguide WG, and the light beam in the second direction is collimated to be parallel, so that the total reflection propagation occurs in the waveguide without no change in the propagation of the divergent light beam in the first direction. The beam is then modulated by the free-form surface s2, and is converted into a convergent beam in the second direction, but the propagation of the divergent beam in the first direction is not changed. The main imaging unit 1411 (lens3) is a reflective cylindrical Fresnel lens and re-converges the divergent light in the first direction emitted from the waveguide. The main diffusor 1420 is a reflective cylindrical concave mirror array. The converging light reflected by the reflective cylindrical Fresnel mirror irradiates on the main diffusor 1420 and is scattered by the main diffusor 1420, and the light converges and is imaged in space in the first direction, thus forming a floating image at the second image plane 102. In particular, the light rays diverge in the second direction, thereby expanding the field angle of view in the second direction.

The optical elements lens1, lens2, S 1, S2 constitute an afocal system (a telescopic system) in the second direction, wherein position k1 is the pupil entry position of the afocal system (galvanometer position of MEMS scanning projection), position k2 is the exit pupil position of the system, and the function of the afocal system is that after the parallel beams in the second direction passing through the afocal system with different incident angles, the exit light beams at the exit pupil position is still the parallel beams in the second direction with different angles. Therefore, the beam emitted from the object point irradiates on the main diffusor through lens1, lens2, S1 and S2, and is approximately parallel in the second direction.

In this way, the image-side aperture angle of the points on the object plane 10 imaged by the main imaging unit 1411 in the first direction is relatively large (i.e., 20 degrees or more, preferably more than 30 degrees), satisfying the binocular parallax condition, whereby a floating image with horizontal parallax but without vertical parallax can be formed at the second image plane (i.e., the floating image plane) 102. In addition, due to the use of optical waveguide to transmit light, a slimmer off-axis system design can be achieved, which has higher optical efficiency and is more conducive to modular production.

The Fourth Example

Figure 15A:
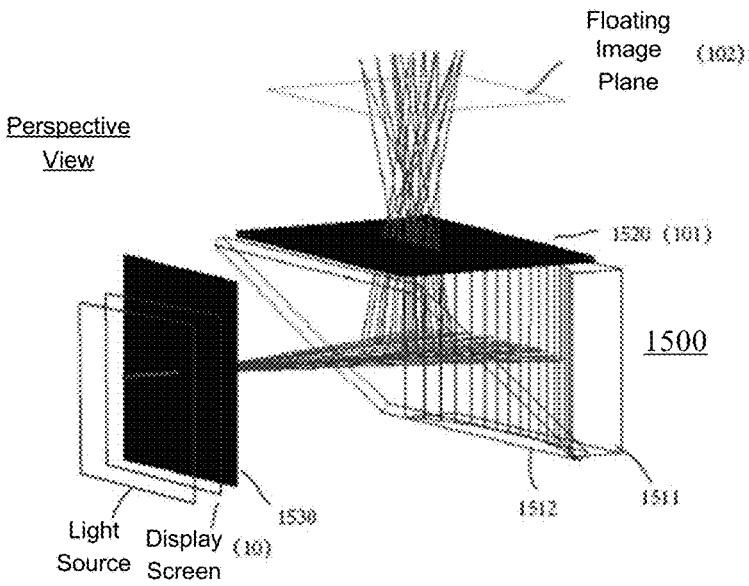
FIGS. 15A-15C respectively show a schematic perspective view, a side view and a top view of a floating display device according to a fourth example of the present invention.
Figure 15B:
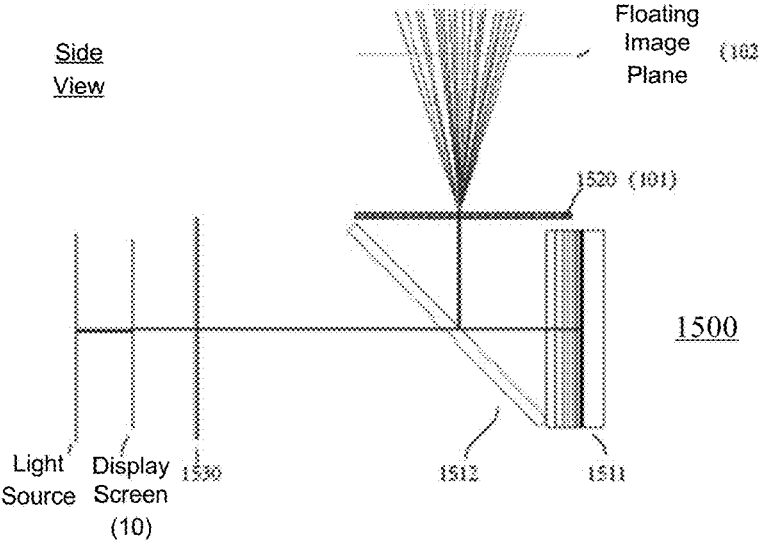
Figure 15C:
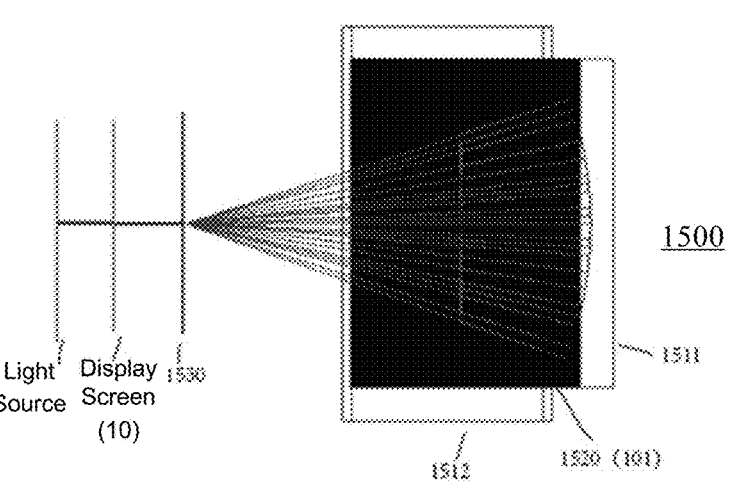

FIGS. 15A-15C respectively show a schematic perspective view, a side view and a top view of a floating display device according to a fourth example of the present invention in which a concave mirror is used for imaging. Certain details of the imaging process of the optical imaging system 1500 of the floating display device according to the fourth example are the same as those of the optical imaging system 1300 of the floating display device according to the second example and will not be repeated here. The following mainly describes the differences of the fourth example.

As shown, the floating display device includes a parallel-light source, a spatial light modulator (i.e., a display screen), and an optical imaging system 1500. In this example, the optical imaging system may include a first diffusor 1530, at least one imaging unit 1510, and a second diffusor 1520. At least one imaging unit 1510 may include a transflective lens (i.e., an auxiliary imaging unit) 1512 and a cylindrical mirror (i.e., a main imaging unit) 1511 disposed between the second diffusor 1520 and the first diffusor 1530 on the optical path.

In the optical system 1500, the light beam propagation direction is the direction of the optical axis, the first direction and the second direction are two directions orthogonal to the optical axis, and the first direction and the second direction are orthogonal to each other.

When the light emitted by the parallel light source irradiates on the display screen to form a display image, the surface on which the display image is located can be regarded as the object plane 10. The light emitted from the plane where the display image is located is parallel light, which is used for parallel projection imaging, and any position behind the display screen can be used as the image plane. The display image is irradiated on the first diffusor 1530 in parallel, and the first diffusor 1530 diverges light in the first direction without changing the transmission of light in the second direction. In this case, the position of the first diffusor 1530 can be considered as a relay image plane. The light rays passing through the first diffusor 1530 are partially irradiated to the cylindrical mirror 1511 through the transflective lens 1512. The cylindrical mirror 1511 converges the light rays in the first direction and does not change the transmission of the light rays in the second direction. The light rays reflected by the cylindrical mirror 1511 are partially reflected by the transflective lens 1512, and the reflected light rays are irradiated to the second diffusor 1520. The second diffusor 1520 may be a cylindrical microlens array or a one-dimensional holographic diffusor. The second diffusor 1520 scatters light rays in the second direction, expanding the field angle of view in the second direction and the light rays in the first direction converge in space to form a floating image 102 (i.e., at the second image plane 102). In the process of light transmission, the main imaging unit does not change the light divergence angle in the second direction, so the light beam emitted from the object point irradiates on the main diffusor and is approximately parallel in the second direction.

In this way, the image-side aperture angle of the points on the object plane 10 imaged by the main imaging unit 1511 in the first direction is relatively large (i.e., 20 degrees or more, preferably more than 30 degrees), satisfying the binocular parallax condition, whereby a floating image with horizontal parallax but without vertical parallax can be formed at the floating image plane (second image plane 102). In addition, due to the use of the cylindrical mirror, the image can be magnified in the horizontal direction, while not magnified in the vertical direction.

The Fifth Example

Figure 16:
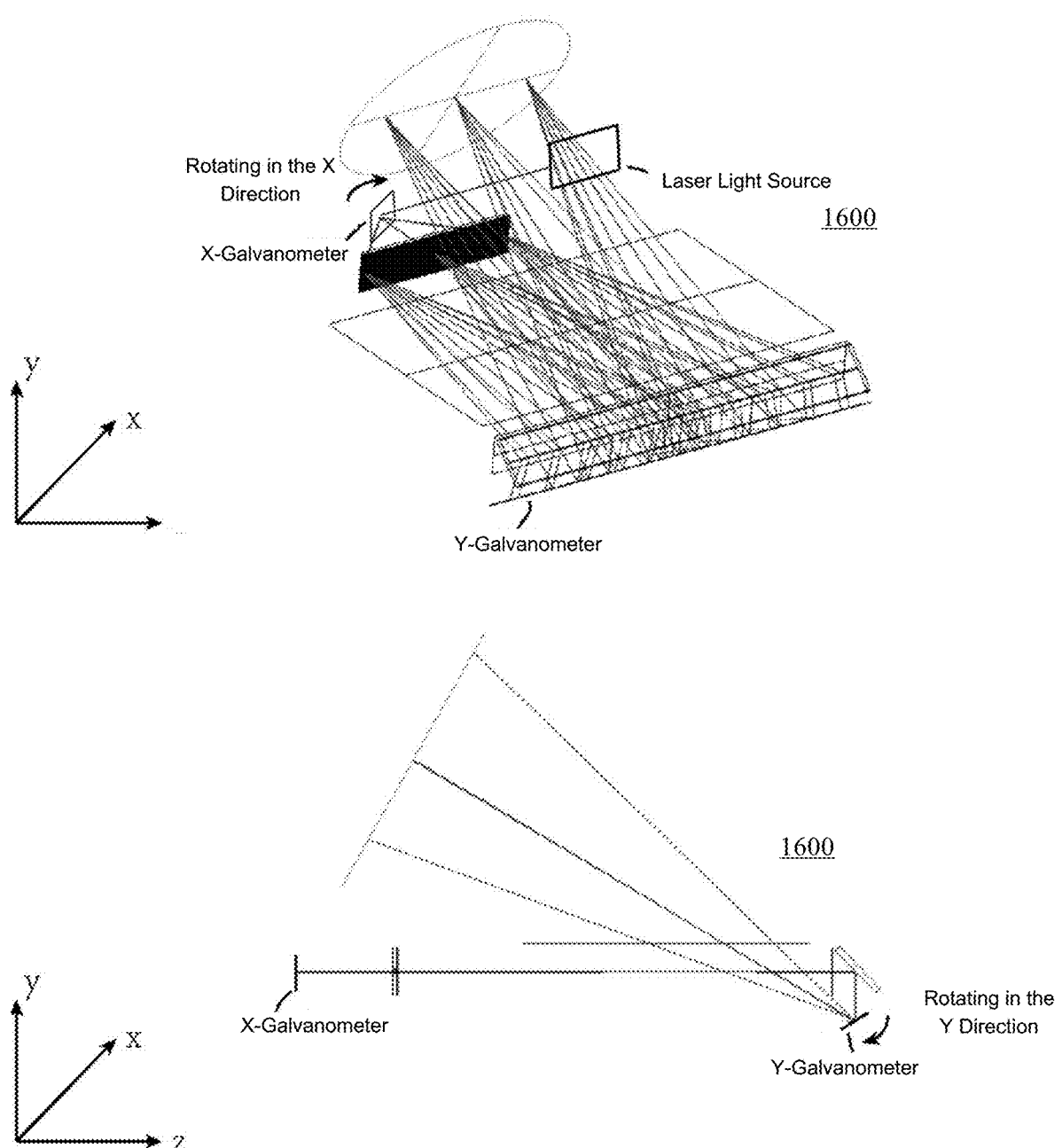
FIG. 16 shows a schematic diagram of a floating display device according to a fifth example of the present invention.

FIG. 16 shows a schematic diagram of a floating display device according to a fifth example of the present invention in which an optical imaging system 1600 for floating display is used in conjunction with a laser MEMS scan projection. Certain details of the optical imaging system 1600 in the floating display device according to the fifth example are the same as those of the optical imaging system 1200 described above with respect to FIGS. 12A-12A and will not be repeated here. The following mainly describes differences of the fifth example.

In this example, the scanning galvanometers in the x and y directions can be arranged separately; X-galvanometer can control laser beam to scan an image in the x direction, Y-galvanometer can control laser beam to scan the image in the y direction; a V-shaped groove microstructure can be integrated on the y-galvanometer. In this example, parallel light scanning imaging is performed, and the main imaging unit does not change the divergence angle of the light in the second direction, so the light beam emitted from the object point irradiates on the main diffusor and is approximately parallel in the second direction. The advantage of this structure is that the thickness of the optical system can be made very small.

Sixth Example

Figure 17:
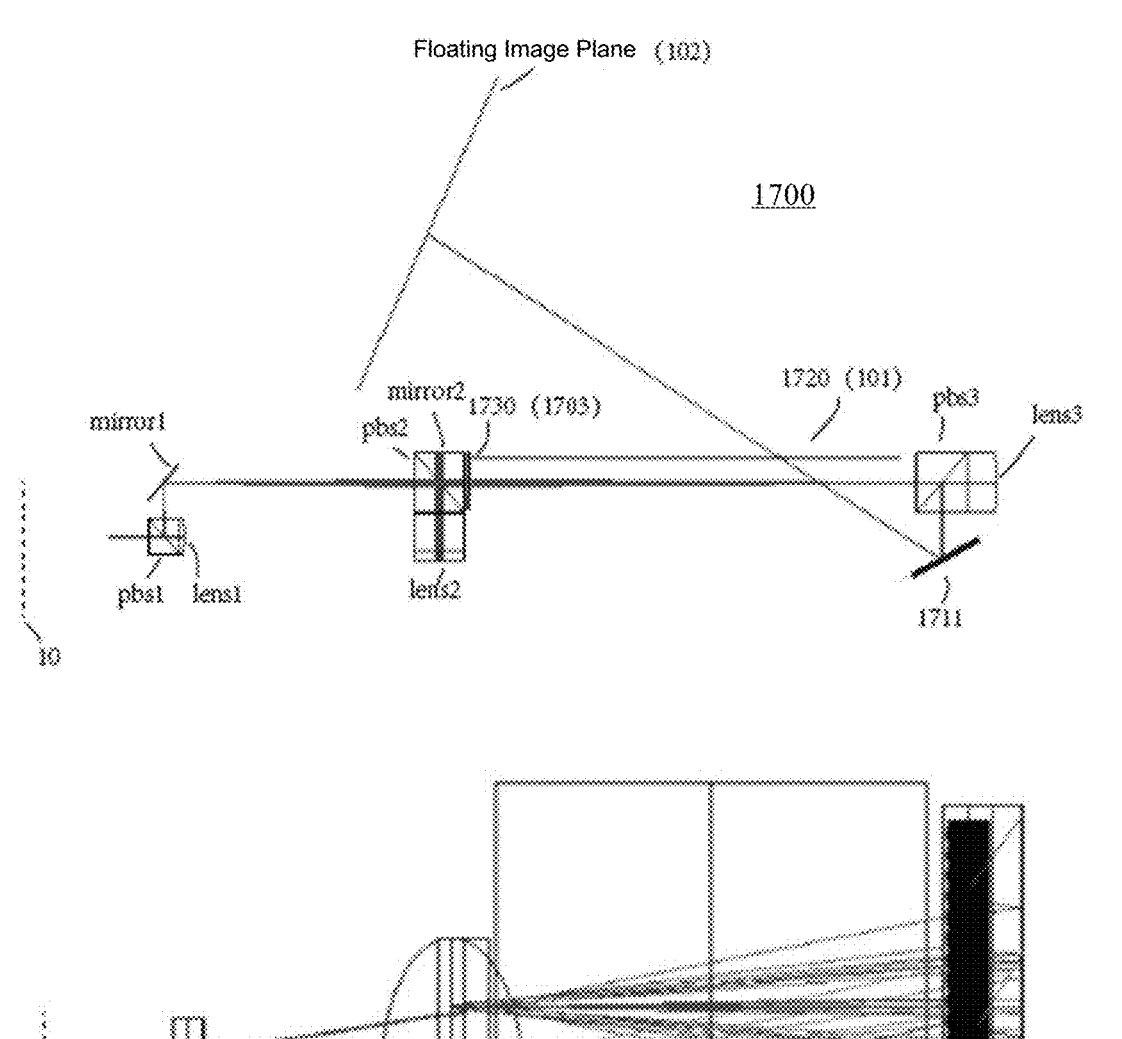
FIG. 17 shows a schematic diagram of a floating display device according to a sixth example of the present invention.

FIG. 17 shows a schematic diagram of a floating display device according to a sixth example of the present invention in which an optical imaging system 1700 for floating display is used in conjunction with a laser MEMS scan projection. Certain details of the imaging process of the floating display device according to the third example are the same as the optical imaging system 1200 described above with respect to 12a-12c and will not be repeated here. The following mainly describes the differences of the sixth example.

In this example, the optical imaging system 1700 includes: an auxiliary imaging unit disposed on the optical path between the object plane 10 and the first image plane 101; an additional diffusor 1730 disposed at the relay image plane 1703; a main imaging unit arranged between the object plane 10 and the first image plane 101 along the optical path; and a main diffusor 1720 disposed at the first image plane 101. Referring to FIG. 17, an arrangement of the auxiliary imaging unit and the main imaging unit in the optical imaging system 1700 according to the sixth example is shown. Specifically, the auxiliary imaging unit may include optical elements such as a first polarization beam splitting prism (pbs1), a first lens (lens1), a plurality of mirrors (MR1 and MR2), a first polarization beam splitting prism (pbs2), a second lens (lens2), a third polarization beam splitting prism (pbs3), a third lens (lens3), and the like. The lens (lens2) is a toric mirror, which have different curvature radii in x and y directions, and can modulate light in x and y directions at the same time. The main imaging unit may include a retroreflector 1711. In this example, the first lens (lens1) the second lens (lens2) and the third lens (lens3) are all plano-convex lenses wherein the plano-convex surfaces are plated with a metal reflective layer.

In the optical system 1700, the light beam propagation direction is the direction of the optical axis, the first direction and the second direction are two directions orthogonal to the optical axis, and the first direction and the second direction are orthogonal to each other.

The RGB laser light source vibrates in the first direction and the second direction through the scanning galvanometer, and projects the laser beam at different angles. A linear polarizer is provided on the front surface of the first polarization beam splitting prism (pbs1) to obtain a p-state laser beam with a high degree of polarization (referred to as p-light). A ¼ wave plate is provided between the first polarization beam splitting prism (pbs1) and the first lens (lens1). The p-light is converted into circularly polarized light by passing through the first polarization beam splitting prism (pbs1) and the ¼ wave plate, reflected by the first lens (lens1), and then passes through the ¼ wave plate again. At this time, the laser beam is s-state polarized light (referred to as s-light). The first lens (lens1) is a cylindrical mirror for converging the laser beam in the second direction and limiting the height of the optical system in the second direction. The s-light is reflected by the beam splitting interface of the first polarization beam splitting prism (pbs1), and then reflected by the first mirror (MR1), which changes the transmission path and irradiate on the second polarization beam splitting prism (pbs2). A ¼ wave plate is arranged between the second polarization beam splitting prism (pbs2) and the second lens (lens2). The s-light is reflected by the beam splitting interface of the second polarization beam splitting prism (pbs2) and then reflected by the second lens (lens2). After passing through the ¼ wave plate twice, it is converted into p-light, and after passing through the splitting interface of the second polarization beam splitting prism (pbs2), it is irradiated on the reflecting mirror (MR2). The second lens (lens2) is a toric lens having different focal lengths in the first and second directions. The second lens (lens2) is used to collimate laser beams with different angles in the first and second directions into beams propagating in parallel along the optical axis in the first and second directions. A ¼ wave plate is provided between the reflector (MR2) and the second polarization beam splitting prism (pbs2), and the light reflected by the reflector (MR2) passes through the ¼ wave plate and is converted into s-light, which is reflected by the beam splitting interface of the second polarization beam splitting prism (pbs2) and exits the second polarization beam splitting prism (pbs2). The light exiting surface of the second polarization beam splitting prism (pbs2) is provided with an additional diffusor 1730, and that surface is a relay image plane 1703 on which light emitted from a point on the virtual object plane forms a line segment image in the second direction. The additional diffusor diverges the light beam impinging thereon in the first direction without changing the transmission of light in the second direction. A ½ wave plate is arranged between the polarization beam splitting prism (pbs3) and the additional diffusor. The s-light emitted from the additional diffusor, after being converted into p-light by ½ wave plate, is incident into the third polarization beam splitting prism (pbs3), and is irradiated onto the cylindrical mirror (lens3) via the beam splitting interface of the third polarization beam splitting prism (pbs3). A ¼ wave plate is arranged between the polarizing beam splitting prism (pbs3) and the cylindrical mirror (lens3). The p-light reflected from cylindrical mirror (lens3) passes through the ¼ wave plate twice and is converted into s-light, which is reflected by the beam splitting interface so that the optical axis rotates 90 degrees and the s-light irradiates on the one-dimensional retroreflector. In this example, the one-dimensional retroreflector is a main imaging unit 1711, which has a V-shaped groove array structure with a V-shaped groove angle of 90 degree and a metal reflective layer on the surface. The one-dimensional retroreflector is arranged at an angle of 30 degrees with the X-Z plane, and the divergent light beams in the first direction emitted from the additional diffusor are reflected by the one-dimensional retroreflector, converge in space in the first direction, and form a floating image at the second image plane (i.e., floating image plane) 102, and the floating image has an angle of 60 degrees to the X-Z plane. A main diffusor 1720 is provided in the X-Z direction between the floating image plane 102 and the one-dimensional retroreflector, and its position can be regarded as the position of the first image plane 101, because the light beam is parallel in the second direction and has an infinite depth of field, and the first image plane 101 and the main diffusor 1720 can be provided at any position between the main imaging unit 1711 and the floating image plane 102, depending on design requirements. The main diffusor diverges light in the second direction and expands the field angle of view in the second direction. In this example, an optical element between the scanning galvanometer and the main imaging unit 1711 constitutes an afocal imaging system whereby a light beam emitted from an object point irradiates on the main diffusor and is approximately parallel in the second direction.

In this manner, a floating image with horizontal parallax but without vertical parallax may be formed at the second image plane (i.e., the floating image plane) 102. In addition, since the whole system is a reflective optical system, the system has no chromatic aberration and can be collapsed in space, so as to realize a large-size and lightweight floating display device.

Optionally, the polarization beam splitting prism (pbs) in this example may be replaced by a polarization reflecting plate.

Seventh Example

Figure 18:
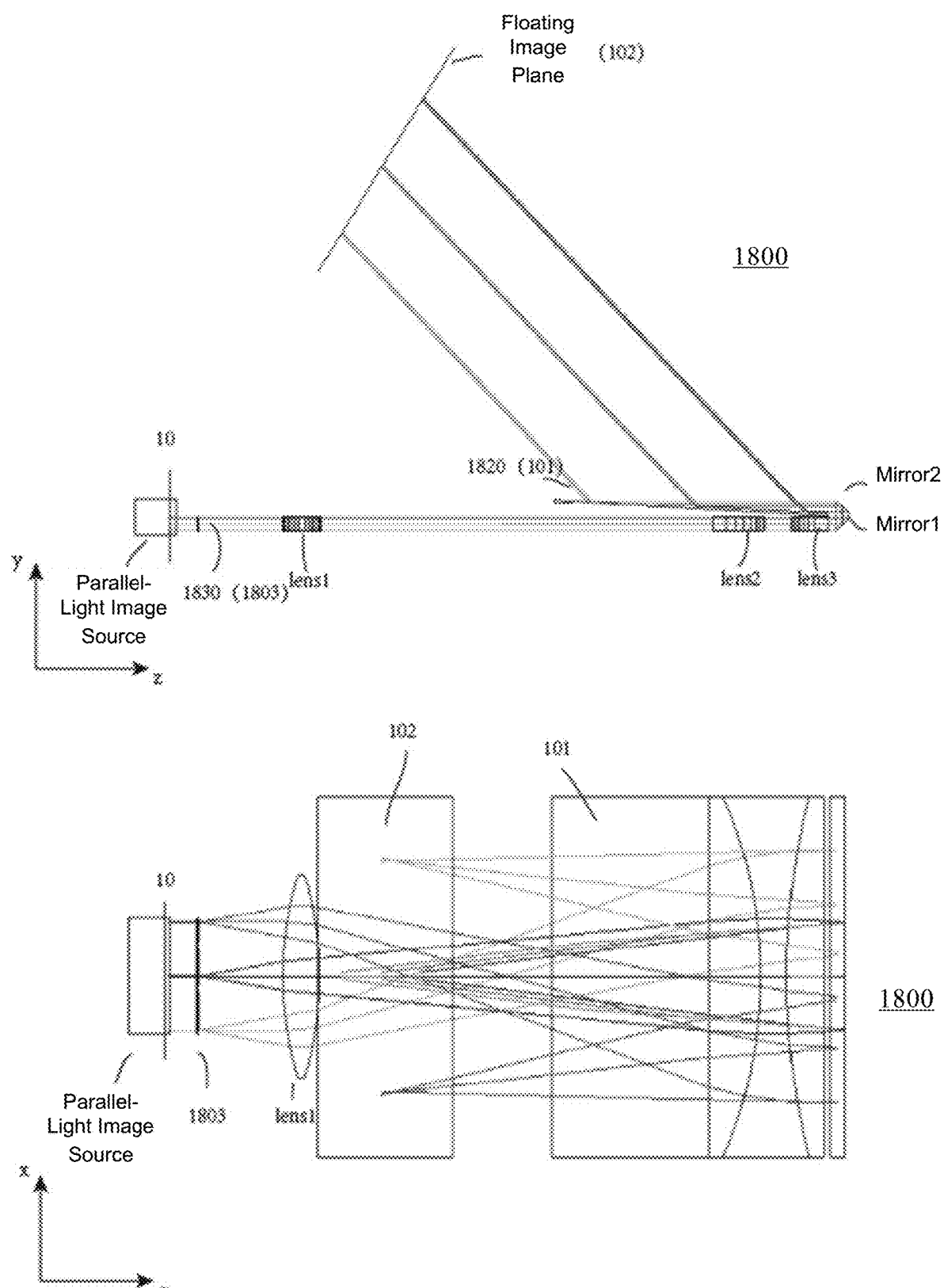
FIG. 18 shows a schematic diagram of a floating display device according to a seventh example of the present invention.

FIG. 18 shows a schematic diagram of a floating display device according to a seventh example of the present invention in which an optical imaging system 1800 for floating display is used in conjunction with a parallel light projection and images a first direction image using a lens group. Certain details of the optical imaging system 1800 in the floating display device according to the seventh example are the same as the optical imaging system 600 described above with respect to FIG. 7 and will not be repeated here. The following mainly describes the differences of the seventh example.

As shown, the floating display device includes a parallel-light image source and an optical imaging system 1800. In this example, the optical imaging system may include an additional diffusor 1830, an imaging unit 1811, and a main diffusor 1820. The imaging unit may include a first lens (lens1), a second lens (lens2), a third lens (lens3), a first mirror, and a second mirror, disposed between the additional diffusor 1830 and the main diffusor 1820 along the optical path, arranged as shown in FIG. 18, wherein lens1, lens2 and lens3 are the main imaging units. The first lens (lens1), the second lens (lens2), and the third lens (lens3) may be cylindrical lenses. The function of the lens group is to magnify the image in the first direction and to correct the aberration of the image. The second diffusor 2 is arranged to be tilted at a certain angle.

In this example, the parallel image source is composed of a parallel backlight and an LCD display. The LCD display surface is an object plane 10. The parallel light emitted from the LCD is projected on an additional diffusor 1830 in parallel. The additional diffusor 1830 diverges the light in the horizontal direction without changing the light transmission in the vertical direction. The plane where the additional diffusor is located is the relay image plane 1803. The light emitted by the additional diffusor passes through the first lens (lens1), the second lens (lens2), and the third lens (lens3) to form a real image in space, forming a floating image surface 102. The first mirror and the second mirror are used for changing the transmission path of light rays. The light reflected by the mirror2 irradiates on the tilted main diffusor 1820 which diverges the light in the second direction and expands the field angle of view in the vertical direction.

In this way, the image-side aperture angle of the image on the object plane 10 imaged on the second image plane 102 in the first direction is relatively large (i.e., 20 degrees or more, preferably more than 30 degrees), whereby a floating image magnified in the second direction with horizontal parallax but without vertical parallax can be formed at the floating image plane.

In this example, the image is magnified by the lens group in the first direction, the image is magnified in the second direction by irradiating parallel light on the tilted main diffusor, and the two directions may have different magnification. In order to obtain floating image in a normal scale in the first and second directions, preferably the pixel size of the spatial light modulator (LCD display) is set to be different in the two directions, i.e., the display pixel is not square but rectangular.

Eighth Example

Figure 19:
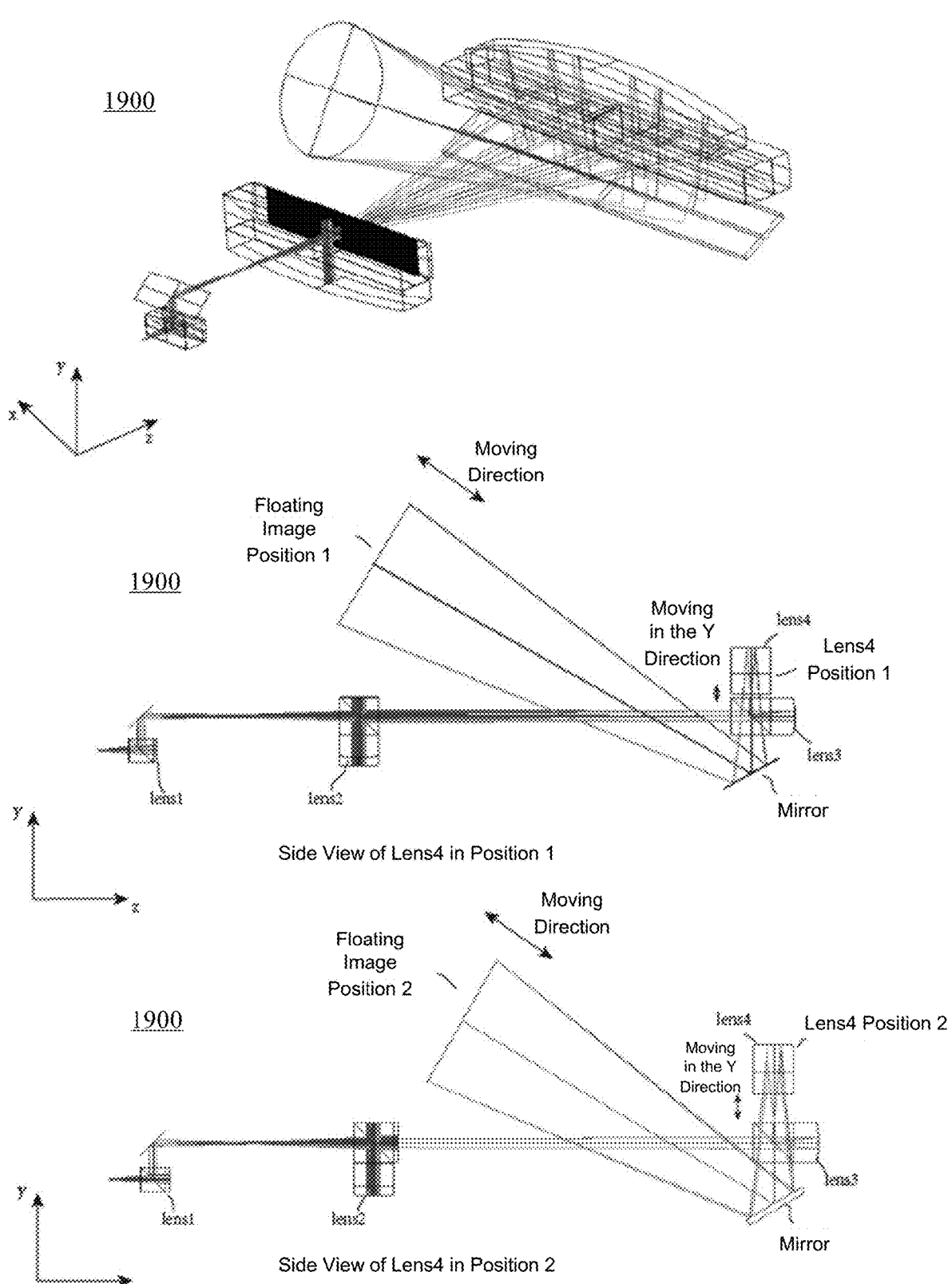
FIG. 19 shows a schematic diagram of a floating display device according to an eighth example of the present invention.

FIG. 19 shows a schematic diagram of a floating display device according to an eighth example of the present invention in which an optical imaging system 1900 for floating display is used in conjunction with a laser MEMS scan projection. Certain details of the imaging process of the optical imaging system 1900 of the floating display device according to the eighth example are the same as those of the optical imaging system 1700 according to the sixth example and will not be repeated here. The following mainly describes the differences of the eighth example.

In this example, a fourth lens (lens4) and the reflector are used instead of the retroreflector and are arranged as shown in FIG. 19. The fourth lens (lens4) can be mechanically moved rapidly along the y direction. According to the object image formula, the image distance v satisfies $$v = \frac{f}{1 - \frac{f}{u}}$$

wherein u is the object distance. In this example, f is constant, so if u increases, v decreases. The floating image plane can be moved back and forth along the optical axis. When the fourth lens (lens4) moves fast enough in the y direction so that the period of one movement cycle is less than 0.1 s, and the current desired image is displayed at each movement position, the dynamic effect of the floating image can be achieved, and when a sliced image of the 3D image is displayed at each movement position, the 3D image effect can be seen according to the multi-layer 3D display principle. Optionally, if the imaging lens employs a fast zoom lens such as a liquid/liquid crystal lens, the position of the floating image may also be changed by changing the focal length f of the imaging lens, thereby achieving the dynamic or 3D effect.

Similar to the floating display device above, the invention also provides a corresponding surround-view display device.

Figure 20A:
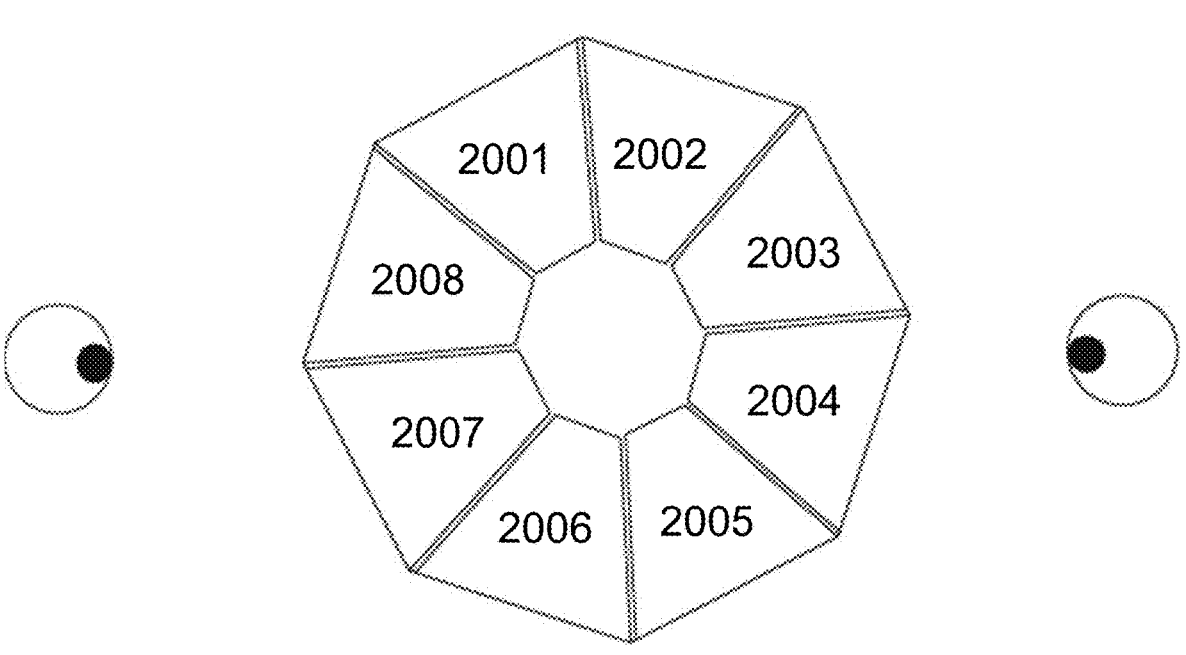
FIGS. 20A-20C show schematic diagrams of a surround-view display device 2000 according to an embodiment of the present invention.

FIG. 20A shows a schematic diagram of a surround-view display device 2000 according to an embodiment of the present invention in which a stitching scheme is employed to implement a 360-degree viewable surround-view display device.

Figure 20B:
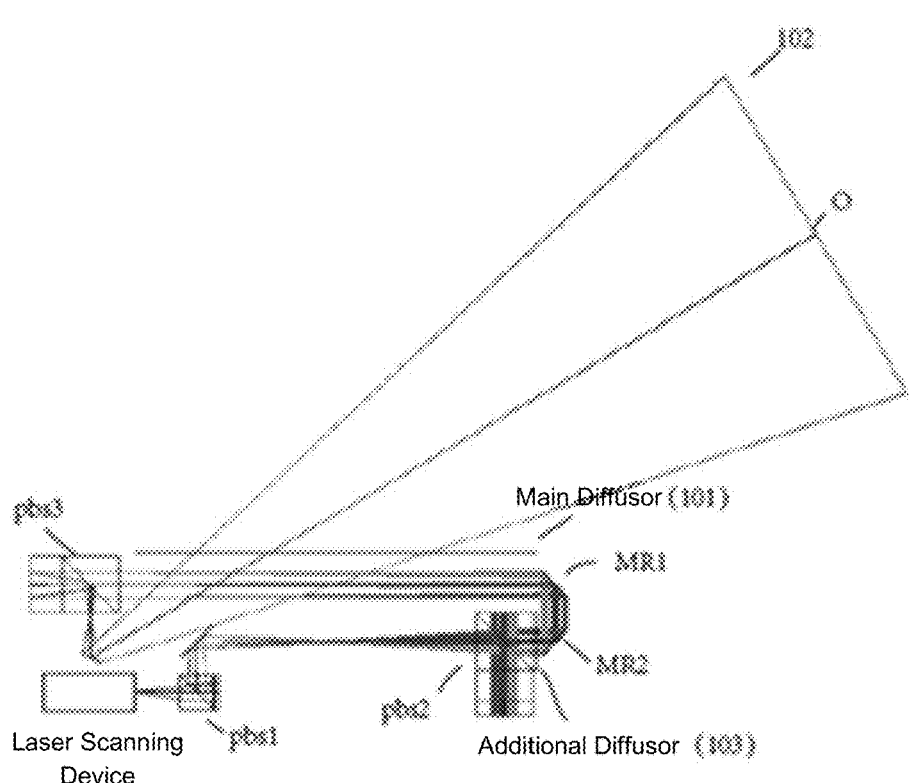
Figure 20C:
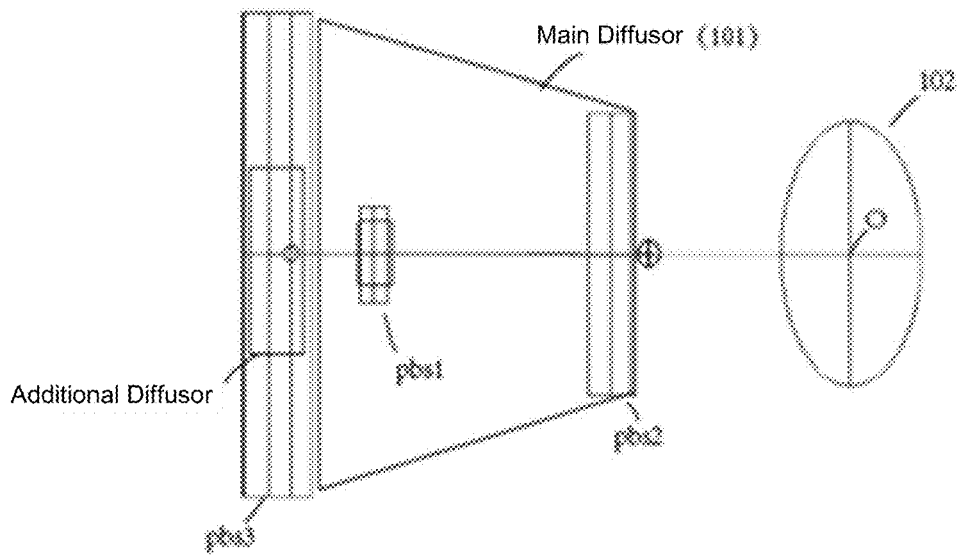

In this example, the surround-view display device 2000 is constituted of eight aforementioned floating display devices (FIG. 20B shows a possible configuration of the floating display devices as an example). In FIG. 20A, eight floating display devices are designated by reference numerals 2001-2008, respectively. FIG. 20C shows a top view of the example floating display device of FIG. 20B. As shown, the floating display devices have a trapezoidal structure and are stitched together in the manner as in FIG. 20A. Preferably, the floating image 102 is at an angle of 45-90 degrees with respect to the horizontal direction. Further precise setting can be made so that the center point (Point O) of the floating image 102 formed by the eight floating display device units coincides with each other. For example, if the horizontal field angle of each of floating images is 45 degrees, then the eight floating display devices can be stitched together into a full field angle of 360 degrees. When the eight floating display devices are respectively used to display images corresponding to eight positions of a three-dimensional object, the surround-view display device has a 3D display effect. Note that, the application of eight floating display devices using a stitching scheme is only by way of example and not limitation, and those skilled in the art will appreciate that the number of spliced floating display devices may be any integer greater than 2, such that the surround-view/3D display effect can be achieved.

An optical imaging system for floating display, a floating display device including the optical imaging system and a surround-view display device according to exemplary embodiments of the present invention are described in detail above. With the optical imaging system, the image-side aperture angle of the points on the object plane 10 imaged by the imaging unit in the first direction is relatively large, to satisfy the binocular parallax condition, thereby enabling the floating display of the image, and the floating image has only the unidirectional parallax, which can be further used for naked-eye 3D display.

It is to be understood that the above description is intended to be illustrative, and not restrictive. For example, the above-described embodiments (and/or aspects thereof) may be used in combination with each other. In addition, various modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

The invention claimed is:

1. An optical imaging system for floating display, the optical imaging system sequentially defining an object plane, a first image plane, and a second image plane along an optical axis thereof, the optical imaging system comprising:

at least one imaging unit comprising a main imaging unit, the main imaging unit being located downstream of the object plane and configured to converge a light beam from a point on the object plane on the first image plane to form a line image in the first direction, and the first image plane being located downstream of the main imaging unit; and a main diffusor located downstream of the main imaging unit and configured to diverge light in a second direction that is different from the first direction, wherein the second image plane is located downstream of the main diffusor and the first image plane, the at least one imaging unit is configured to converge a light beam from a point on the object plane on the second image plane to form a line image in the second direction, wherein the second image plane is a floating image plane, wherein said main imaging unit, said first image plane and the second image plane are located at different axial positions along the optical axis, and wherein the main imaging unit has different light-converging capabilities in the first direction and the second direction.

2. The optical imaging system of claim 1, further comprising an additional diffusor disposed at the object plane for diverging light in the first direction.

3. The optical imaging system of claim 1, wherein the main imaging unit is a one-dimensional retroreflector.

4. The optical imaging system of claim 1, wherein the at least one imaging unit further comprises an auxiliary imaging unit disposed between the object plane and the main diffusor, and the auxiliary imaging unit comprises a one-dimensional aperture stop for constraining light from the object plane in the second direction.

5. The optical imaging system of claim 1, wherein:

the at least one imaging unit further includes an auxiliary imaging unit such that the optical imaging system further defines one or more relay image planes that are located between the object plane and the main diffusor along the optical axis, and the optical imaging system further includes an additional diffusor disposed within the depth of focus of a particular one of the one or more relay image planes for diverging light in the first direction.

6. The optical imaging system of claim 5, wherein the auxiliary imaging unit is configured to cause a light beam from a point on the object plane to form a line image in the second direction at the particular relay image plane.

7. The optical imaging system of claim 1, wherein the main diffusor is positioned at an angle with respect to the optical axis.

8. The optical imaging system of claim 1, further comprising a louver mask structure for controlling the angle of the light.

9. The optical imaging system of claim 1, wherein the at least one imaging unit comprises one or more of the following:

a one-dimensional retroreflector for converging light in the first direction;

a toric mirror for modulating light in the first direction and the second direction simultaneously;

an optical waveguide for propagating light therein;

a cylindrical lens for converging light in one direction without changing the propagation of light in another direction orthogonal to said direction; and a lens group located between the object plane and the first image plane along the optical axis, for propagating light therebetween.

10. The optical imaging system of claim 1, wherein the optical imaging system has an infinite depth of focus in the second direction for the first image plane, and wherein the first image plane is located at any position between the at least one imaging unit and the second image plane.

11. The optical imaging system of claim 1, wherein the main imaging unit comprises: a lens configured to be mechanically moved along the optical axis in the y-direction, with the movement being sufficiently rapid such that a movement cycle is less than 0.1 seconds to enable dynamic adjustment of the focal point, or a fast zoom function lens configured to enable adjustment of the focal length along the optical axis within less than 0.1 seconds.

12. The optical imaging system of claim 1, wherein the at least one imaging unit further includes a transflective lens disposed between the object plane and the main imaging unit and between the main imaging unit and the main diffusor along the optical path.

13. The optical imaging system of claim 12, wherein the imaging light from the object plane is incident on the main imaging unit via the transflective lens, and the imaging light emitted from the main imaging unit is reflected on the main diffusor through the transflective lens.

14. The optical imaging system of claim 1, wherein the object plane and the main diffusor are arranged parallel to each other.

15. The optical imaging system of claim 1, wherein the image height of the optical imaging system in the first direction is equal to the object height in the first direction.

16. The optical imaging system of claim 1, wherein the object plane and the second image plane are in an upright imaging relationship.

17. A floating display device, comprising:
the optical imaging system of claim 1; and
an image display unit configured to emit light constituting an image toward the object plane of the optical imaging system.

18. The floating display device of claim 17, wherein:
the image display unit is a direct-view display source, and a display surface of the image display unit is provided at the object plane; or
the image display unit is a projection-based display source, and the projection surface of the image display unit is provided at the object plane.

19. A surround-view display device, comprising:
a plurality of floating display devices according to claim 17 are arranged in a stitched manner.

\* \* \* \* \*